(12) United States Patent
Li et al.

(10) Patent No.: US 9,772,794 B2
(45) Date of Patent: Sep. 26, 2017

(54) METHOD AND APPARATUS FOR BIG DATA CLOUD STORAGE RESOURCE MANAGEMENT

(71) Applicant: University of Florida Research Foundation, Incorporated, Gainesville, FL (US)

(72) Inventors: Tao Li, Gainesville, FL (US); Ruijin Zhou, Sunnyvale, CA (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/174,657

(22) Filed: Jun. 6, 2016

(65) Prior Publication Data

US 2016/0357443 A1 Dec. 8, 2016

Related U.S. Application Data

(60) Provisional application No. 62/171,447, filed on Jun. 5, 2015.

(51) Int. Cl.
*G06F 12/00* (2006.01)
*G06F 3/06* (2006.01)
*G06F 11/14* (2006.01)
*G06F 9/455* (2006.01)

(52) U.S. Cl.
CPC .............. *G06F 3/065* (2013.01); *G06F 3/067* (2013.01); *G06F 3/0617* (2013.01); *G06F 3/0647* (2013.01); *G06F 11/1446* (2013.01); *G06F 11/1448* (2013.01); *G06F 9/45533* (2013.01)

(58) Field of Classification Search
CPC ...... G06F 3/065; G06F 3/0617; G06F 3/0647; G06F 3/067; G06F 11/1446; G06F 11/1448; G06F 9/45533
See application file for complete search history.

(56) References Cited

U.S. PATENT DOCUMENTS

2008/0120459 A1\* 5/2008 Kaneda ............... G06F 11/1451
711/112

OTHER PUBLICATIONS

"Oracle Information Architecture: An Enterprise Architect's Guide to Big Data," *Oracle Enterprise Architecture White Paper*, Mar. 2016, pp. 1-49.

(Continued)

*Primary Examiner* — Shawn X Gu
(74) *Attorney, Agent, or Firm* — Saliwanchil, Lloyd & Eisenschenk

(57) ABSTRACT

A system and method for storage resource management using copy-on-write/read snapshots to redirect the I/O requests without moving the virtual disk is disclosed herein. The system includes storage pools, a virtualized server, and a centralized data center management server. The virtualized server includes a base disk and a virtualized disk having a copy-on-write and a copy-on-read snapshot process responsive to an I/O request that merges a previous snapshot stored on a first one of the plurality storage pools with the base disk stored on a second one of the plurality of storage pools, while it fetches a new snapshot to be stored on a third one of the plurality of storage pools from the previous snapshot or the base virtual disk. The system includes a performance model, employing an exponentially weighted moving average with an adjustable sliding window.

20 Claims, 18 Drawing Sheets

(56) References Cited

OTHER PUBLICATIONS

Agrawal, Divyakant et al., "Big Data and Cloud Computing: Current State and Future Opportunities," *EDBT 2011*, Uppsala, Sweden, Mar. 22-24, 2011, pp. 1-4.
Alvarez, Guillermo A. et al., "MINERVA: An Automated Resource Provisioning Tool for Large-Scale Storage Systems," *ACM Transactions on Computer Systems*, Jun. 11, 2001, pp. 1-28.
Amazon AWS, https://aws.amazon.com/, 2016.
Anderson, Eric et al., "Hippodrome: running circles around storage administration," *FAST '02*, Monterey, California, U.S.A., Jan. 28-30, 2002, pp. 175-188.
Azure, https://azure.microsoft.com/en-us/, 2016.
Basak, Jayanta et al., "Model Building for Dynamic Multi-tenant Provider Environments," *AGM SIGOPS Operating Systems Review*, 2012, pp. 1-12.
Gulati, Ajay et al., "BASIL: Automated IO Load Balancing Across Storage Devices," *USENIX*, FAST 2010, pp. 1-14.
Gulati, Ajay et al., "Pesto: Online Storage Performance Management in Virtualized Datacenters," *SOCC'11*, Cascais, Portugal, Oct. 27-28, 2011, pp. 1-14.
Gulati, Ajay et al., "Storage Workload Characterization and Consolidation in Virtualized Environments," VPACT, 2009, pp. 1-10.
Hadoop, http://hadoop.apache.org, last published Jun. 16, 2016.
Herodotou, Herodotos. "Hadoop Performance Models," *Technical Report*, Duke University, CS—May 2011, pp. 1-19.
Hibench, https://github.com/intel-hadoop/HiBench, 2016.
IOmeter, http://www.iometer.org/, 2016.
Kavalanekar, Swaroop et al., "Characterization of Storage Workload Traces from Production Windows Servers," *IISWC*, Seattle, Washington, U.S.A., Sep. 14-16, 2008, pp. 119-128.
Kim, Minkyoung et al., "Mobile Network Estimation," *Proceedings of the ACM Conference on Mobile Computing and Networking*, Rome, Italy, Jun. 2001, pp. 1-13.
KVM, http://www.linux-kvm.org/page/Main_Page, accessed on Jun. 17, 2016.
Libvrit 1.2.1, https://libvirt.org/, 2016.
Lin, Xuelian et al., "A Practical Performance Model for Hadoop MapReduce," *IEEE International Conference on Cluster Computing Workshops*, Beijing, China, Sep. 24-28, 2012, pp. 231-239.
Lu, Chenyang et al., "Aqueduct: online data migration with performance guarantees," *FAST '02*, Monterey, California, U.S.A., Jan. 28-30, 2002, pp. 219-230.
Mashtizadeh, Ali et al., "The Design and Evolution of Live Storage Migration in VMware ESX," *USENIX ATC*, 2011, pp. 1-14.
Park, Nohhyun et al., "Romano: Autonomous Storage Management using Performance Prediction in Multi-Tenant Datacenters," *SOCC'12*, Oct. 14-17, 2012, San Jose, California, U.S.A., pp. 1-14.
pt-diskstats, https://www.percona.com/doc/percona-toolkit/2.1/pt-diskstats.html, 2016.
QEMU, http://wiki.qemu.org/Main_Page, last updated May 11, 2016.
Rimal, Bhaskar Prasad et al., "A Taxonomy and Survey of Cloud Computing Systems," *Fifth International Joint Conference on INC, IMS and IDC*, 2009, pp. 44-51.
Ruiz-Alvarez, Arkaitz et al., "An Automated Approach to Cloud Storage Service Selection," *ScienceCloud'11*, San Jose, California, U.S.A., Jun. 8, 2011, pp. 1-10.
Singh, Aameek et al., "Server-Storage Virtualization: Integration and Load Balancing in Data Centers," *High Performance Computing, Networking, Storage, and Analysis*, 2008, pp. 1-12.
VMware Distributed Resource Scheduler, accessed from: https://www.vmware.com/products/vsphere/features/drs-dpm, 2016.
VMware Storage Distributed Resource Scheduler, accessed from: http://www.vmware.com/products/vsphere/features/storage-drs.html, 2016.
Voellm, Tony. "Useful IO profiles for simulating various workloads," *Microsoft Developer*, May 7, 2009, accessed from: https://blogs.msdn.microsoft.com/tvoellm/2009/05/07/useful-io-profiles-for-simulating-various-workloads/.
Waldspurger, Carl A. "Memory Resource Management in VMware ESX Server," *Proceedings on the $5^{th}$ Symposium on Operating Systems Design and Implementation*, Boston, Massachusetts, U.S. A., Dec. 9-11, 2002, pp. 1-15.
Wang, Mengzhi et al., "Storage Device Performance Prediction with CART Models," *$12^{th}$ Anual Meeting of the IEEE/ACM International Symposium on Modeling, Analysis, and Simulation of Computer and Telecommunication Systems (MASCOTS)*, Volendam, the Netherlands, Oct. 5-7, 2004, pp. 1-8.
Zhou, Ruijin et al., "Optimizing Virtual Machine Live Storage Migration in Heterogeneous Storage Environment," *VEE'13*, Houston, Texas, U.S.A., Mar. 16-17, 2013, pp. 73-84.

* cited by examiner

METHOD AND APPARATUS FOR BIG DATA CLOUD STORAGE RESOURCE MANAGEMENT

CROSS-REFERENCE RELATED APPLICATIONS

This application claims the benefit of U.S. Provisional Application Ser. No. 61/171,447, filed Jun. 5, 2015, which is incorporated herein by reference in its entirety.

GOVERNMENT SUPPORT

This invention was made with government support under grant numbers NSF#1017000; NSF#0937869; and NSF#0845721 awarded by National Science Foundation. The government has certain rights in the invention.

BACKGROUND OF INVENTION

Storage Resource Management (SRM) focuses upon optimizing the efficiency and processing speed of a Storage Area Network's (SAN's) use of the available drive space. As organizations are faced with increased hardware and storage management costs, many have introduced automatic storage resource management, where storage virtualization in data centers is used to lower maintenance labor costs. Storage virtualization represents the separation of logical storage from physical storage, where data may be accessed without regard to the physical storage or heterogeneous structure. Particularly, through the use of automatic storage resource management, virtual disks are automatically rearranged and migrated, such that the performance of storage pools can meet specific IT policy requirements (e.g. performance load balancing and capacity planning).

Commercial software, such as VMware's® Storage Distributed Resource Scheduler (SDRS), have been deployed in modern data centers. However, during the era of public/hybrid cloud and big data analytics, traditional storage management schemes fail to respond to the real-time I/O burst in a public/hybrid cloud due to the large size of virtual disks. This commercial software is typically incapable of performing real time policy-based storage management due to the high cost of migrating large size virtual disks. More particularly, although traditional storage resource management schemes work fine in a private data center that executes most of the jobs at daytime (keeping idle at night), modern data centers usually host multi-tenant cloud platforms and run big data applications 24 hours, seven days a week (24/7). Unlike the traditional server applications, big data and cloud workloads exhibit highly fluctuating and unpredictable I/O behaviors. For instance, any user/tenant on the cloud platform can submit jobs at any time, which introduces unexpected workload surges. Secondly, the big data applications manifest distinct I/O behaviors across different execution phases. Since these workload surges occur within a couple of hours or even minutes, they can lead to unexpected storage load imbalance.

Specifically, due to the large size of virtual disks, virtual storage migration takes a long time and causes high I/O traffic overhead to the system. Moving a virtual disk from one storage pool to another can take up to several minutes or hours, during which the workload behavior may have already changed. Worse, the current load-balancing interval (i.e. 8~16 hours) is too long for detecting and responding to workload surges. These limitations can lead to: 1) high average latency of the entire storage system; 2) extremely unbalanced storage resource utilization; 3) low quality of service (QoS); and 4) frequent breaking of the service level agreement (SLA).

Current models of storage management systems mainly focus upon improving the physical device behavior [8, 19, 20, 21, 22, and 23]. As virtualization has been widely adopted in data centers, efforts of managing storage resources using virtual machines have emerged as indicated above. Although the Singh reference [9] proposes a system entitled, HARMONY, including a VectorDot algorithm that minimizes performance degradation, the VectorDot algorithm only considers the storage system utilization and ignores workload behaviors. Related works, Basil [3], Pesto [4], and Romano [5], consider both the device and workload behaviors; yet, they leverage workload and device characteristics reported by the virtual machine monitor and rearrange storage resources by migrating virtual disks across different storage pools, which is a lengthy process.

The Gulati reference [3] proposes the Basil system, having both workload and device models, which can automatically balance the I/O load across storage devices. Based on these models, storage latency can be predicted and the load-balancing algorithm is performed accordingly. However, the Basil system's storage model is built offline, which limits its usability in a real system.

To address this issue, the Gulati reference [4] proposes the Pesto system implemented in VMware's® SDRS, which incorporates an online storage model (L-Q model). This system implements a workload injector to proactively adjust the storage model online when the system is not busy. The Pesto system further includes congestion management and a cost benefit function. However, the Park reference [5] finds that both the Basil and Pesto systems make improper balance decisions due to the limitation of their models. Park proposes the Romano system, which makes multiple load-balancing decisions before actually migrating the virtual disks, where a simulated annealing algorithm is used to filter out the potentially incorrect decisions.

In summary, all existing storage management schemes share several common drawbacks. The basic unit of these management schemes is a virtual disk, whose size can range from several hundreds of Gigabytes (GBs) to even several Terabytes (TBs). Often, migrating this large size virtual disk results in long migration time and high performance degradation. Although there have been efforts to improve the efficiency of storage migration, the cost of migrating large size virtual disks is still significant. The lengthy migration process hinders the current storage management from being used in real time. Instead of tracking and migrating virtual disks frequently, existing systems usually monitor and collect performance characteristics during the entire daytime, using 95% of the sampled data to predict the average latency of the next day. The actual load balancing decisions and storage migrations are made at night, when no application is running. When a private data center has steady I/O behavior, these traditional methods can achieve a desirable load balancing effect.

Nevertheless, as indicated above, for modern data centers that host public cloud platforms (e.g. Amazon AWS [16], Microsoft Azure [17]) and run big data applications [18], workload I/O behavior can heavily fluctuate even within one day. Although the Basak reference [7] discloses a dynamic performance model for multi-tenant cloud, no resource-scheduling algorithm is proposed. The Alvarez reference [30] presents an approach that selects cloud storage services from a cloud tenant's perspective. Yet, in a multi-tenant cloud environment, highly varying I/O behavior leads to frequent storage load imbalances using this approach, which cannot be handled in a timely manner using existing storage management schemes.

BRIEF SUMMARY

A system and method for storage resource management that improves the efficiency of big data cloud storage management by leveraging the copy-on-write/read snapshots to redirect the I/O requests without moving the virtual disk is disclosed herein. An embodiment of the system includes a plurality of storage pools, a virtualized server, and a centralized data center management server. An embodiment of the virtualized server includes a base disk and a virtualized disk having a copy-on-write and a copy-on-read snapshot process responsive to an I/O request that merges a previous snapshot stored on a first one of the plurality storage pools with the base disk stored on a second one of the plurality of storage pools, while it fetches a new snapshot to be stored on a third one of the plurality of storage pools from the previous snapshot or the base virtual disk. The system may also build a performance model, employing an exponentially weighted moving average with an adjustable sliding window to provide a quick and accurate performance prediction. Furthermore, the system may include a hybrid management scheme, which can dynamically choose either the snapshot process or migration for the fastest performance tuning.

The system and method disclosed herein can provide fast storage performance tuning for virtualized storage management system software in light of the emerging multi-tenant big data cloud environment. The method allows the management software to dynamically choose either the copy-on-write/read snapshots or the storage migration based on the estimated performance tuning time. The method also provides a performance model for the snapshot based storage management.

In light of the traditional data center storage management's (VMware SDRS's) slow performance and high overhead, embodiments of the system disclosed herein offers an advantage in that the system can significantly lower the performance overhead of storage management and facilitate the management process. Further, embodiments of the system are useful with respect to storage management can be performed for the big data and cloud computing IT industries.

A specific embodiment of the subject system can be referred to as the Light Storage Resource Management (LightSRM), and can work properly in a time-variant cloud environment. To mitigate the storage migration cost, embodiments of the system disclosed herein may use copy-on-write/read snapshots to redirect the I/O requests without moving the virtual disk. To support snapshots in a storage management, the system may include a performance model specifically for snapshots. The system and method may include an exponentially weighted moving average with adjustable sliding window to provide quick and accurate performance prediction. Furthermore, the system may include a hybrid management scheme, which can dynamically choose either snapshot or migration for fastest performance tuning.

An embodiment was built in a Quick Emulator Kernel-based Virtual Machine (QEMU/KVM) based virtualized environment. Experimental results show that the implementation of the copy-on-write/read snapshot can redirect I/O requests in a faster manner than migration can do when the virtual disk size is large. Further, implementation of a snapshot method has less disk performance impact on applications running on the computer system or network. By employing the hybrid snapshot/migration method disclosed herein, LightSRM yields less overall latency, better load balance, and less I/O traffic overhead.

BRIEF DESCRIPTION OF DRAWINGS

FIG. 3B shows Storage Latency versus time and FIG. 3C shows Storage IOPS versus time.

FIG. 4A shows Storage Latency versus time and FIG. 4C shows Storage IOPS versus time.

DETAILED DISCLOSURE

Embodiments of the subject invention relate to a lightweight and fast storage management system and method, a specific embodiment of which can be referred to as the Light Storage Resource Management (LightSRM). Embodiments of the system can quickly respond to workload surges. To free storage management from large virtual disks and lengthy migration duration, copy-on-write/read snapshots are used as basic units to tune the I/O performance. The overhead of creating and merging a snapshot is much smaller than that of migrating the entire virtual disk. Since the introduction of snapshot changes the storage I/O behavior, the system can implement a performance model for the copy-on-write/read snapshot. With the help of quick performance tuning, the system can deploy a real-time performance tracking mechanism, exponentially weighted moving average with adjustable sliding window, to provide an accurate latency prediction. Additionally, the system can include a hybrid method based on a characterization of both snapshots and migration, which can dynamically decide to use either snapshot or migration to achieve the fastest performance tuning.

An embodiment of the system may be implemented in a QEMU/KVM based virtualized environment. The system may adopt libvirt as a communication framework to obtain the information of virtual machines and send commands to virtualized servers. The system may also include the traditional storage resource management scheme in this environment for comparison purpose. Experimental results show that implementation of copy-on-write/read snapshots has less transition time when the virtual disk size is large; whereas migration is faster when the virtual disk size is small enough. Further, experimental results show that embodiments of the subject snapshot method yields 90% less performance impact on the running applications. Equipped with hybrid snapshot/migration method, LightSRM can provide lower average storage latency (91% lower in our tests) and better-balanced storage environment (93% better) than the traditional method. Furthermore, the hybrid method generates 44% and 91% less disk I/O traffic than snapshot and migration methods respectively.

Specific embodiments of the subject system and method may include 1) a snapshot-based performance tuning method, 2) a performance model for copy-on-write/read snapshot, 3) a quick and simplified storage performance tracking and modeling scheme, and 4) a hybrid mechanism that chooses snapshot or migration online for faster performance tuning.

Figure 1A:
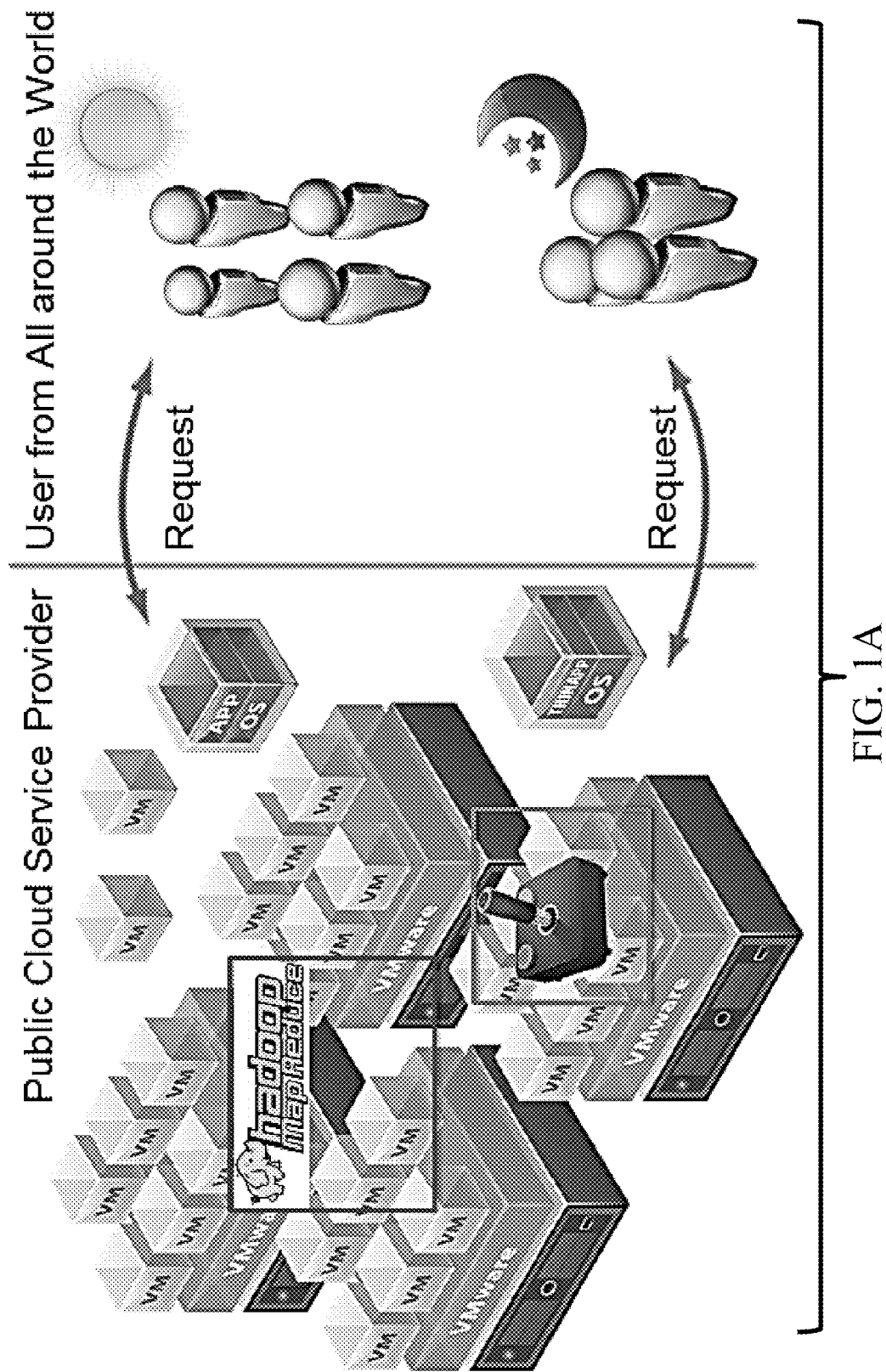
FIG. 1A shows a schematic of a modern data center with a multi-tenant cloud environment.
Figure 1B:
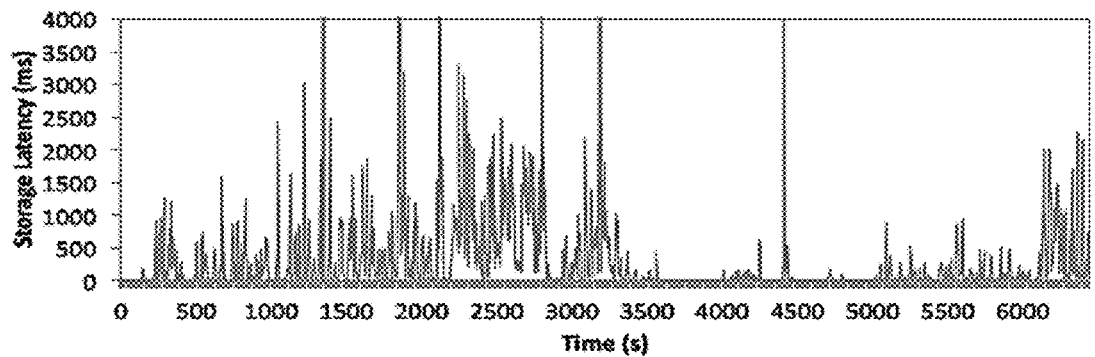
FIG. 1B illustrates a graphical representation of the average storage latency over time when running five Apache™ Hadoop® virtual machines (VMs) on two storage pools.

FIG. 1B illustrates a graphical representation of the average storage latency over time when running five Apache™ Hadoop® virtual machines (VMs) on two storage pools. Traditional server applications, including file servers, mail servers, and database servers, have relatively stable I/O behaviors. Therefore, the storage pools that host these types of applications yield predictable latency on a daily basis. However, modern datacenters also host the multi-tenant public cloud environments and run big data workloads (see e.g., FIG. 1A). In a multi-tenant cloud environment, the tenants' behaviors can vary from day to day. For big data workloads, even the application itself manifests frequent I/O bursts, which leads to highly fluctuating storage latency. With respect to the graphical representation shown in FIG. 1B, five virtual machines, existing in two storage pools, are used as Hadoop nodes. The hardware platform configuration can be found in the experimental setup section below. During the experimentation, applications of hibench suite are run iteratively. As can be seen, the average storage latency of the two storage pools is high with a large variance.

There are two types of performance variance that can occur in data centers: (1) time-variant I/O behavior of the workload and (2) new tasks initiate at any time. Table 1 shows the storage latency with its standard deviation during the execution of big data workloads. During the application execution, the storage latency and its standard deviation of one storage pool is measured. As can be seen in Table 1, the standard deviation of the storage latency is much larger than the average value. This indicates that big data workloads exhibit highly fluctuating I/O behaviors even in one virtual disk. The large standard deviation also reveals the bias of using single average value to represent the storage latency for the entire execution period. A further investigation of application behaviors reveals that they all have highly varying I/O characteristics (e.g. OIO, Read/Write Ratio, Randomness, I/O size). Therefore, using the I/O characteristics of the entire daytime to predict the storage latency of the next day is inaccurate.

Figure 2:
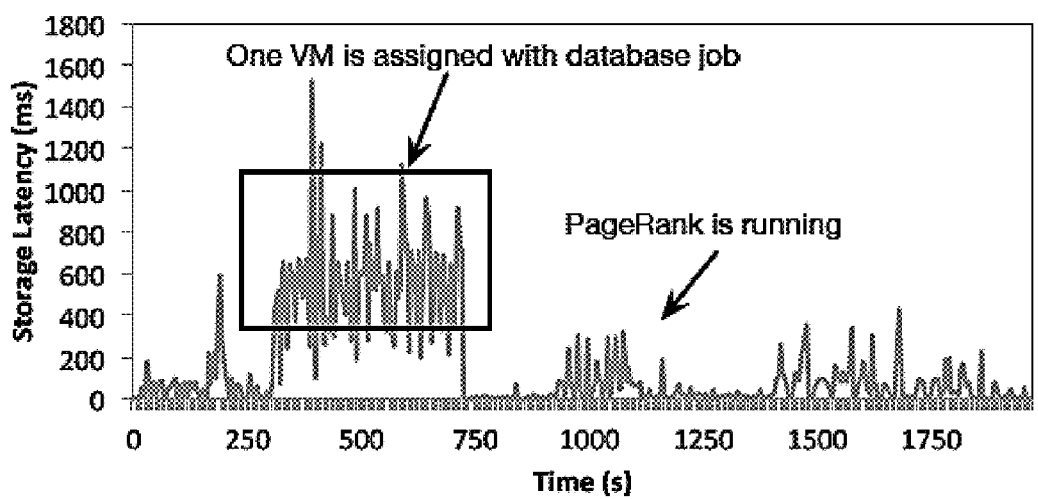
FIG. 2 illustrates a graphical representation of the average storage latency when running five Hadoop® VMs; while the idle VM is scheduled to run a database job during the execution.

FIG. 2 illustrates a graphical representation of the average storage latency when running five Hadoop® VMs; while the idle VM is scheduled to run a database job during the execution. In a multi-tenant public cloud environment, each tenant can activate his/her rented virtual machines to run applications at any time. Therefore, it is not possible to predict the tenant behaviors. Even with a strict job scheduling policy, it is challenging to predict what type of application the tenant is going to execute (I/O intensive or not). In FIG. 2, six VMs are implemented on six storage pools. While the PageRank application runs in the background on five VMs, the remaining VM is assigned with a database job at a certain time that runs for a predetermined period of time. The average storage latency of the six storage pools are measured and shown in FIG. 2. As illustrated, the average latency bumps up once the idle VM is activated to run. In real datacenters, this type of latency jump can occur more frequently. The uncertainty of when a new application is going to be scheduled makes the storage latency prediction even harder. In summary, the system's performance behavior is very difficult to predict, if not impossible. A datacenter administrator typically will have no idea what type of application is going to run at any point in time. Even under a strict scheduling policy, each application has time-variant I/O behaviors. Traditional storage management systems yield inaccurate performance prediction, because they use the performance statistics of one day to predict the storage latency of next day.

TABLE 1

Storage latency (ms) when running big data workloads

|  | Average Latency | Standard Deviation |
| --- | --- | --- |
| PageRank | 35.6 | 119.3 |
| Bayes | 24.4 | 102.2 |
| HiveBench | 2.0 | 6.4 |
| Kmeans | 29.3 | 71.1 |
| Nutchindex | 41.9 | 77.5 |
| Sort | 133.9 | 121.8 |
| TeraSort | 43.1 | 55.3 |
| Wardcount | 52.7 | 111.6 |

Since the storage latency is highly fluctuating and unpredictable, virtual disks may have to be migrated frequently in order to tune the I/O performance and to ensure the policy-based storage management works properly. However, the size of a virtual disk is usually too large to move quickly, hence making the real-time storage management impossible. Worse, a multitenant public cloud environment requires 24/7 service. The conventional way of performing migration at night will not work in this situation. Hence, the system described herein addresses the large size virtual disk in order to implement real-time storage performance management.

Snapshot technology, which is usually used to make backups and checkpoints, may almost instantly redirect I/O requests to a new location (the snapshot file). Once a snapshot is made, all the upcoming write requests will be issued to the new location immediately. The read requests will be issued to the location of the latest data. If copy-on-read technology is enabled, the data blocks will be fetched once from the old location to the new location. Then, all the following reads will be issued to the new location. Embodiments of the subject system described herein leverage snapshot technology similar to that of a cache, where the snapshot file may be gradually filled with the destination storage. Typically, the use of the snapshot technology can change the I/O load more quickly than migration.

Figure 3A:
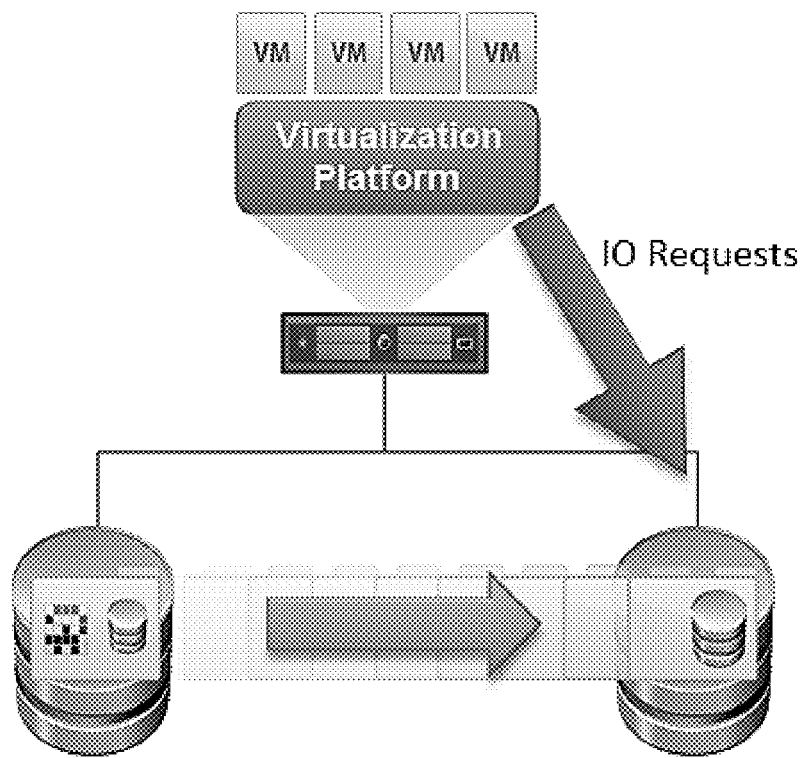
FIG. 3A shows a schematic of storage migration.
Figure 3B:
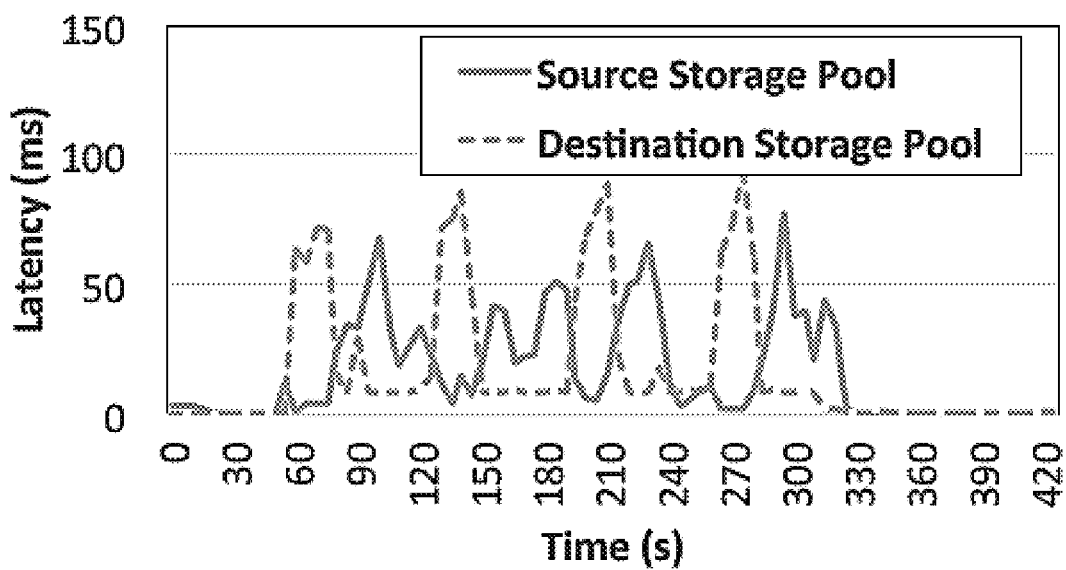
FIGS. 3B-C show a graphical representation of the performance when using storage migration, where
Figure 3C:
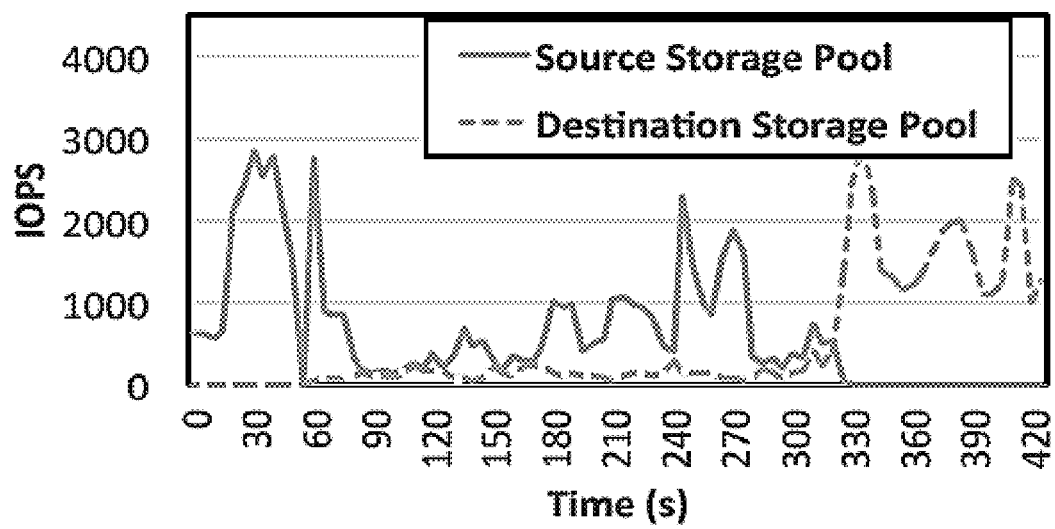
Figure 4A:
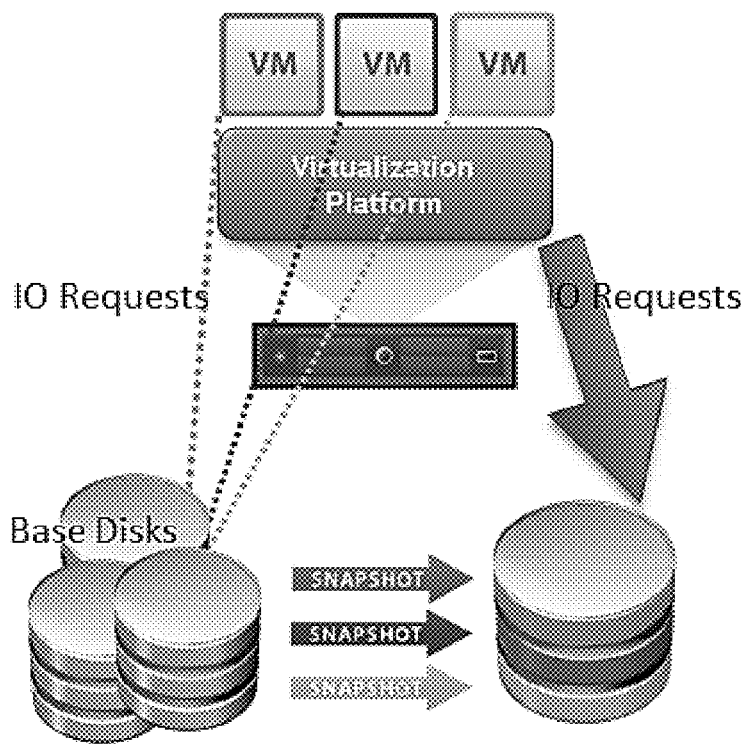
FIG. 4A shows a schematic of snapshot.
Figure 4B:
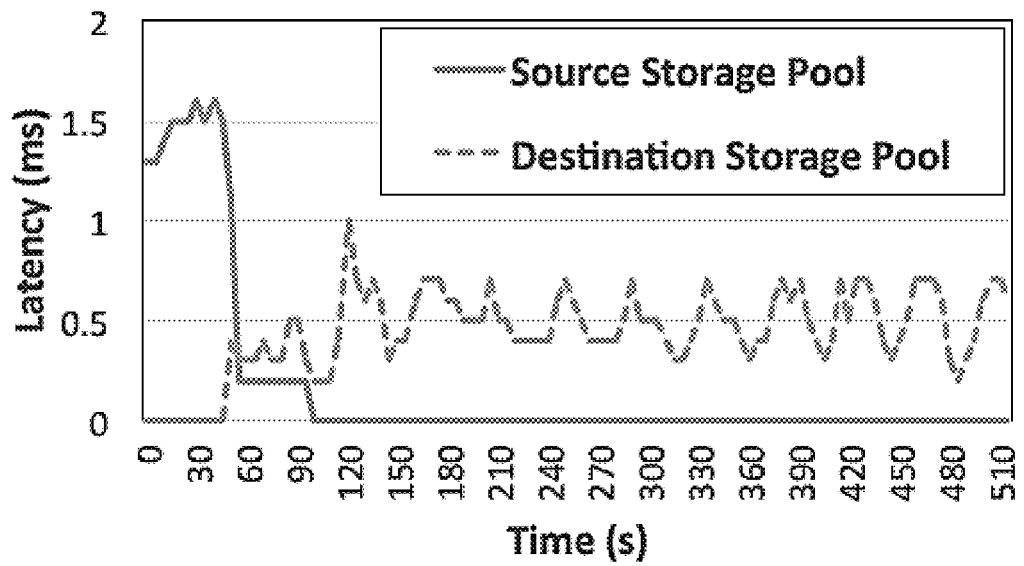
FIGS. 4B-4C show a graphical representation of the performance when using snapshot, where
Figure 4C:
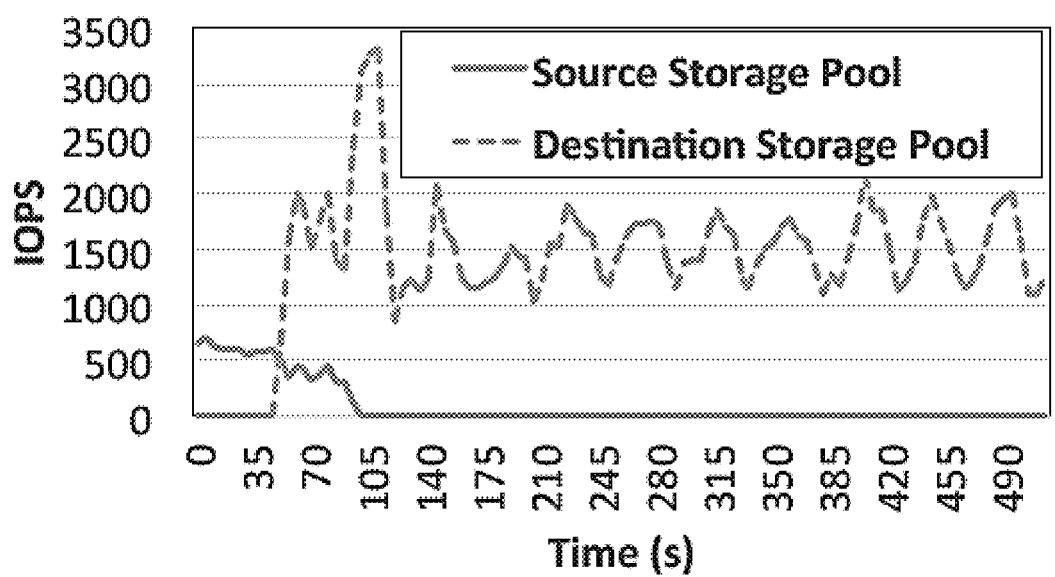

FIGS. 3B-C show a graphical representation of the performance when using storage migration (See FIG. 3A): Where FIG. 3B shows Storage Latency versus time and FIG. 3C shows Storage TOPS versus time; while FIGS. 4B-4C show a graphical representation of the performance when using snapshot (see FIG. 4A), where FIG. 4B shows Storage Latency versus time and FIG. 4C shows Storage IOPS versus time. At the beginning, a disk workload running inside one virtual disk is placed at source storage pool. The storage latency is around 1.5 ms. In FIG. 3B, migration of the virtual disk from source to destination using the default QEMU migration method takes a long time and the storage latency jumps to a much higher value in both source (around 70 ms) and destination (around 60 ms) storage pool. Consequently, the storage throughput (IOPS shown in FIG. 3C) drops to a lower value. In FIG. 4B, a snapshot is processed and placed on the destination pool. As can be seen, the latency of source storage pool immediately drops and the latency of destination pool increases; because, the write requests are served by destination storage instantly, while the latency of the source storage maintains at a low level to serve the read requests. After all the needed data blocks are fetched to the snapshot, the latency of source storage further drops to zero and the workloads completely runs on the destination storage. The same trend can be found for the throughput as shown in FIG. 4C. Therefore, using snapshot technology to tune I/O performance is faster and has lower impact on the storage performance.

Despite the fact that snapshot can swiftly tune I/O performance, using the snapshot technology also poses several new challenges to existing storage management systems: 1) how to implement copy-on-write/read snapshot in real systems, 2) how to build a performance model for snapshot, 3) how to quickly track the storage performance, and 4) how to deal with small size virtual disks, which can be migrated quickly.

One or more of these challenges are addressed by embodiments of the subject lightweight storage management system and method that is based on the foundation of snapshot described herein. Particularly, the LightSRM redesigns the entire management stack to address these challenges. In the embodiment referred to as LightSRM, the snapshot file may be responsible for the performance tuning, while the virtual disk may be used to guarantee the functional correctness.

Figure 5A:
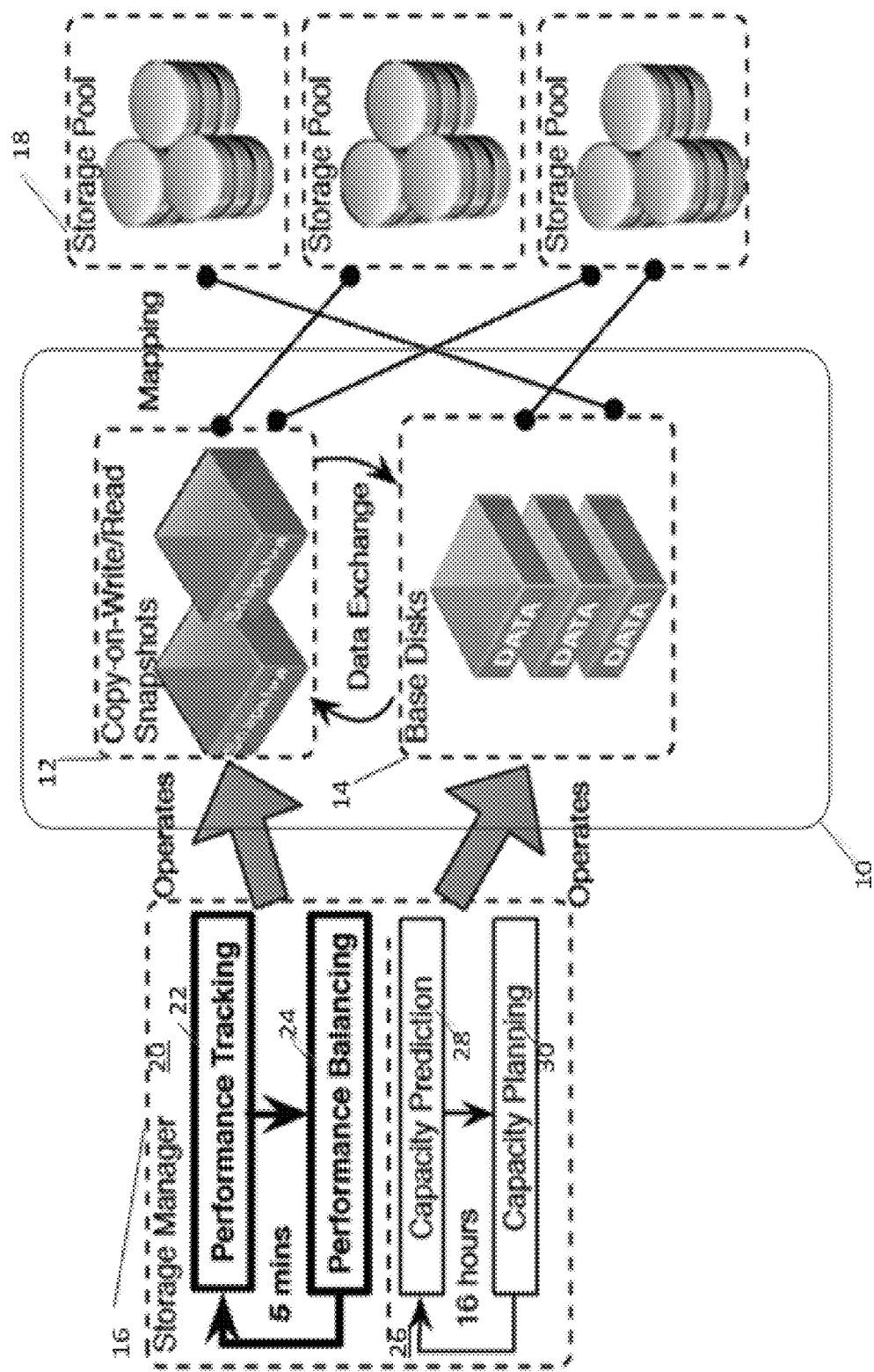
FIG. 5A displays a block diagram of an embodiment of a storage resource management system (LightSRM) described herein.

FIG. 5A displays a block diagram of the storage resource management system (LightSRM) described herein. On each virtualized server 10, the system implements a copy-on-write/read snapshot 12 on top of the original virtual disk 14 to hold the working set of the running applications. On a centralized datacenter management server 16, a storage manager 20 is implemented to perform performance load balancing and capacity planning. The performance tracking 22 and balancing 24 operate on the snapshots, while the capacity prediction 28 and capacity planning 30 manages the base virtual disks. Performance load balancing may be triggered more frequently (i.e. a 5 minute interval) than capacity planning (i.e. a 16 hour interval). The storage resource management system described herein may include a redesigned performance management 20, while incorporating the conventional method of capacity planning and prediction 26; since there is no interference between the performance management 20 and capacity planning and prediction 26.

Figure 5B:
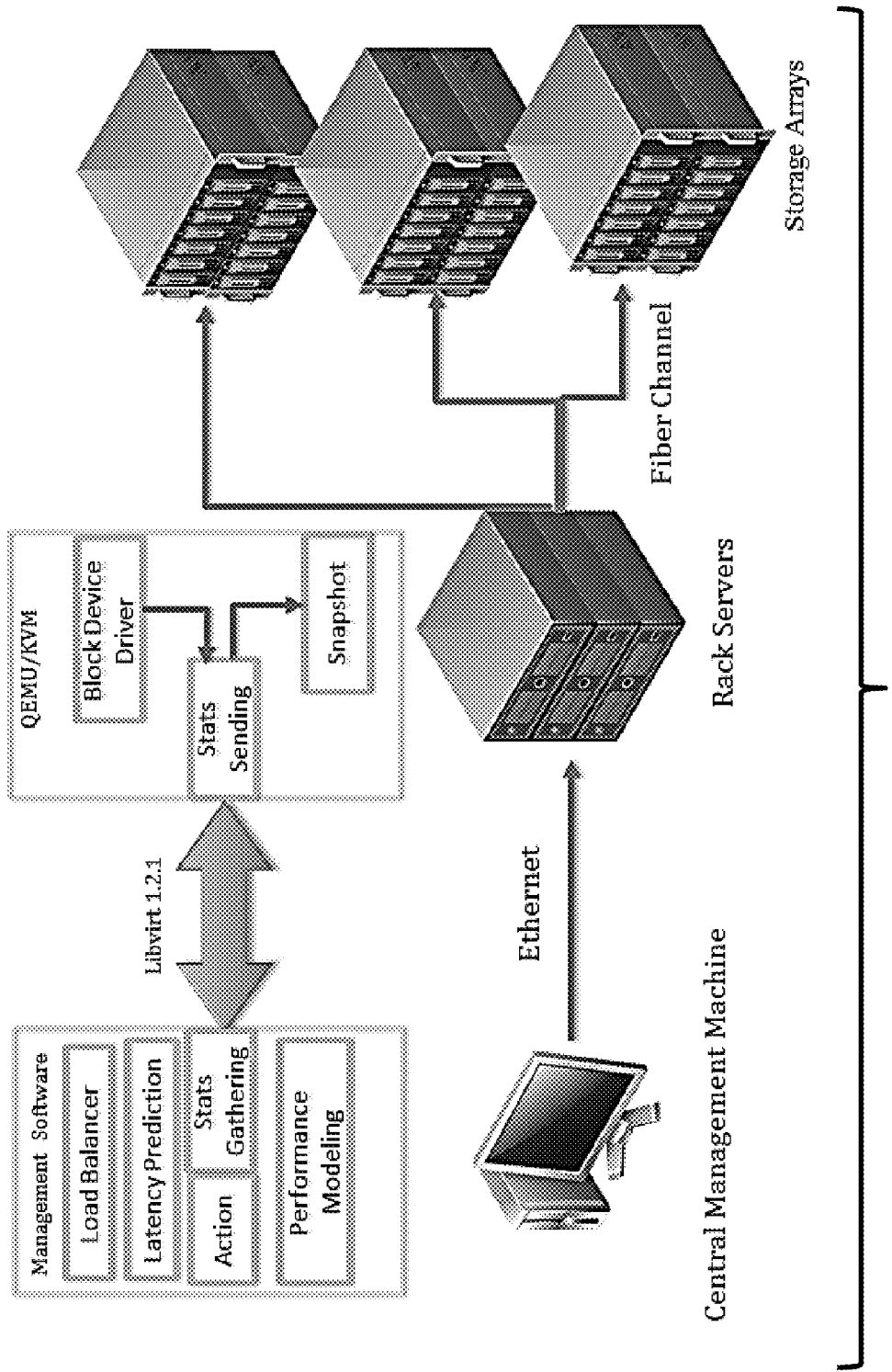
FIG. 5B shows a schematic of an embodiment of a storage resource management system (LightSRM) described herein.

FIG. 5B shows a schematic of an embodiment of the subject system, incorporating a central management machine implementation, management software, rack servers, and storage arrays.

The original snapshot technology is used for backups and checkpoints. In the instance of a data loss event or system failure, a virtual disk can be easily reverted to the previously stored state. In an original snapshot design, copy-on-write technology is leveraged to copy data from a source disk to a new disk when the workload issues a "write" to disk instruction. Since the block size of a snapshot usually is not larger than the I/O size, there is no need to fetch data from old disks. The "read" requests, on the other hand, will be issued to the location of the latest data. Therefore, making an original snapshot redirects the write requests, and not the read requests.

Figure 6:
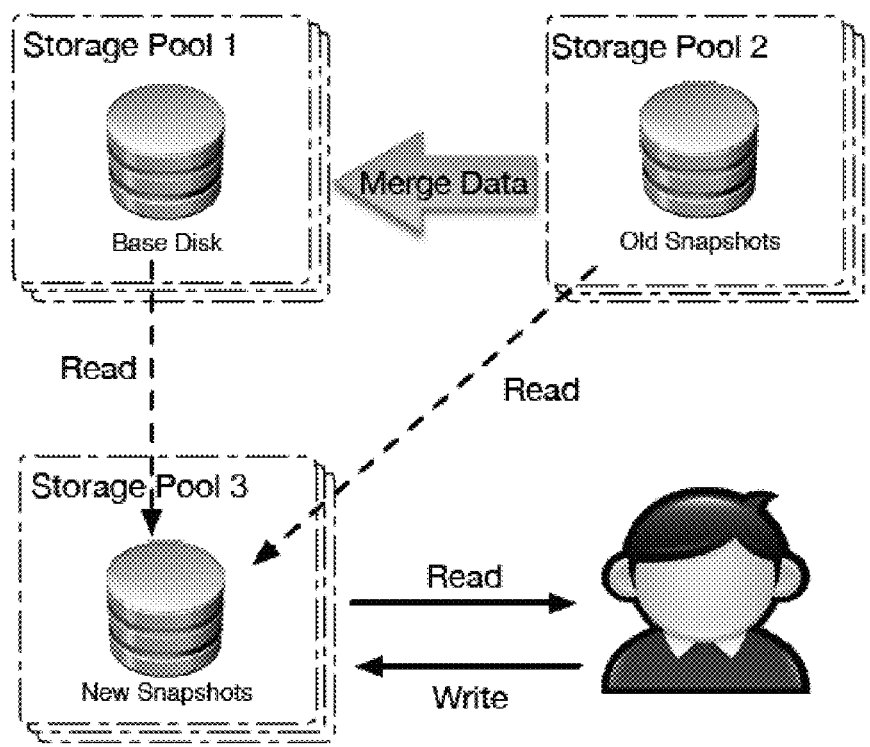
FIG. 6 displays a block diagram for the process of redirecting I/O requests using copy-on-write and copy-on-read snapshots.

FIG. 6 displays a block diagram for the process of redirecting I/O requests using copy-on-write and copy-on-read snapshots, which can be implemented in accordance with an embodiment of the subject invention. In order to redirect the read requests as well, embodiments of the subject system includes a copy-on-read in the snapshot design of the subject system, as shown in FIG. 6. With copy-on-read technology, the read request may trigger the new snapshot to fetch the latest data from the old snapshot or the base virtual disk. After the data blocks are fetched to the new snapshot, the following reads to those data blocks will be served by the new snapshot, thereby redirecting the read requests to the new storage pool. Depending on the workload behavior, the time for the fetching process varies. Typically, it is much less than migration time, since the working set size of a certain application is smaller than the virtual disk size. For the cases where the fetching process takes a longer time than the migration time, the system may include a hybrid method, which uses migration if the migration time is shorter and uses the snapshot procedure if the snapshot transition time is shorter.

Combining both copy-on-write and copy-on-read, in accordance with embodiments of the subject invention, enables the snapshots to quickly divert I/O requests to the destination storage. If the old snapshot is kept, the system may save time associated with the I/O traffic and the time of transferring the old snapshot; however, as time goes by, there may be a lot of snapshots scattered around the storage pools, which will yield a high level of fragmentation. Worse, a long chain of snapshots, not only makes the management even harder but also adds high indexing overhead to each I/O request. Therefore, the process for LightSRM may merge the old snapshot to the base virtual disk at the moment the new snapshot is created, as shown in FIG. 6. Since the size of old snapshot (the workload working set size) is much smaller than the virtual disk size, the merging time is also shorter than migration time. In sum, in specific embodiments of the subject invention, there are two phases of using copy-on-write/read snapshot to redirect I/O requests. During the first phase (Phase #1: Merging and Fetching), LightSRM may merge the old snapshot to base virtual disk, while LightSRM fetches the needed data to the new snapshot. As shown in FIG. 6, additional I/O traffic will be generated on storage pools 1, 2, and 3. During the second phase (Phase #2: Merging or Fetching), either the merging or fetching process finishes, while the unfinished process continues transmitting the data. After Phase #2, the workload may completely run on the destination storage. Therefore, the time used for Phases #1 and #2 can define the transition time for the subject modified snapshot process. Similarly, the transition time for migration is the time necessary to complete a migration.

Figure 7:
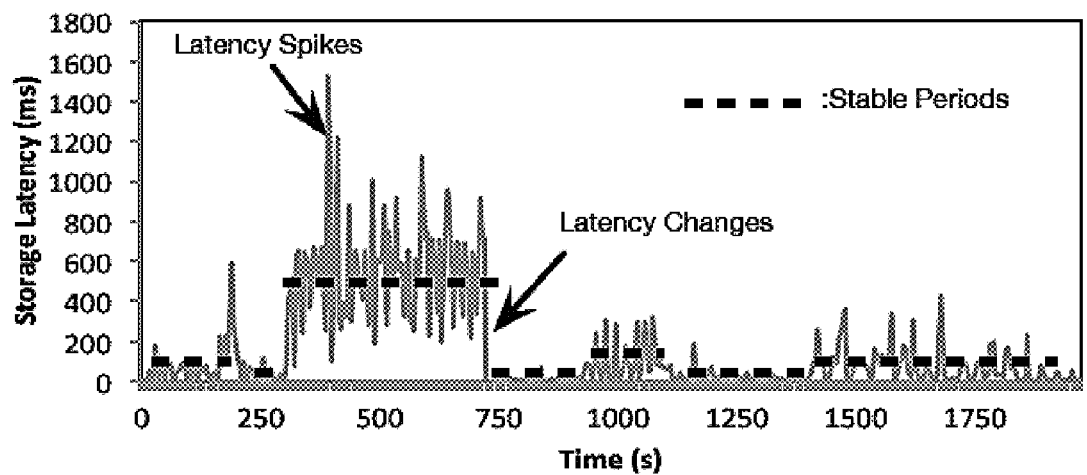
FIG. 7 illustrates a graphical representation of the latency stable period, latency changes, and latency spikes in storage latency with respect to time.

FIG. 7 illustrates a graphical representation of the latency stable period, latency changes, and latency spikes in storage latency with respect to time. Since embodiments of the subject system described herein can quickly rebalance the performance load by just taking a snapshot, a new, fast, and accurate way to track the storage latency has also been implemented in specific embodiments of the subject system. I/O behaviors are not entirely random. For a certain period of time, the workload exhibits stable behaviors, which results in relatively stable storage latency (shown as a dotted line in FIG. 7). The length of the stable period can be workload dependent. In those periods, the average value can represent the storage latency. Similar issues have been identified and tackled in memory usage tracking and network traffic estimation. Embodiments of the subject system may include a storage latency prediction, where latency is tailored and customized using exponentially weighted moving average methods (EWMA).

In a specific embodiment, referred to as LightSRM, a self-adjustable sliding window tracking mechanism is employed. Initially, the sliding window size is set as q. In the sliding window, LightSRM will sample the latency of each storage pool for q times. Then, EWMA is applied to those q samples. The equation is as below:

$$L_t = \alpha*(L_{t-1}+(1-\alpha)L_{t-2}+\ldots+(1-\alpha)^{i-1}L_{t-i}) \quad (1)$$

where $L_i$ means the ith sample of latency and $0<\alpha<1$. In the system described herein, $\alpha$ is set to 0.5. The $L_t$ is calculated for all the storage pools in the system. These values will be used for the load balancing schemes.

As time elapses, new sample points may be added to the sliding window, while the oldest point will be left out. During stable periods, this method can predict the storage latency accurately. However, in the case of the sudden latency change as shown in FIG. 7, the weighted average value may not be able to quickly detect the storage latency in a few sample points. In order to address this issue, specific embodiments of the subject system may continuously compare the deviation of the latest sample point with the standard deviation of the entire sampling window. If the deviation of latest sample point is much higher than the standard deviation in the sliding window, the system marks the point as deviant. If a deviant point keeps appearing in the most recent sample points, the system may assume that it is highly possible that the storage latency changed to another value for the next several periods. In a specific embodiment, weights of previous samples may be intentionally set to 0, such that the deviant point determines the latency of next period.

A fast EWMA (short sliding window) can quickly detect latency changes. However, a fast EWMA can be easily mislead by the deviant point (i.e., the latency spike as shown in FIG. 7). A slow EWMA (long sliding window) can provide a smooth estimate. But, a slow EWMA might cover two different I/O behaviors and report an inaccurate latency value. A known method on memory tracking [32] maintains both EWMAs and the maximum value is chosen as the memory working set size. However, in latency prediction, always choosing maximum value is not accurate. Therefore, LightSRM leverages a self-adjustable sliding window. When the reported latency value keeps flipping, the length of the sliding window may be increase by $\Delta q$. In the alternative, if the reported latency does not change for a long time, the length of the sliding window may be decrease the length by $\Delta q$. In a specific embodiment, $\Delta q$ is set to be one sample point.

Figure 8:
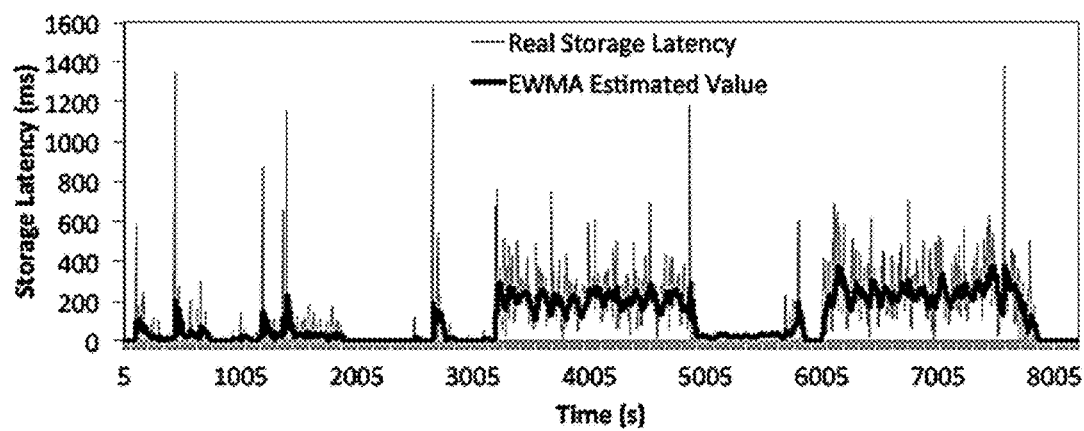
FIG. 8 illustrates a graphical representation of the EWMA tracking for the storage latency.

FIG. 8 illustrates a graphical representation of the EWMA tracking for the storage latency. Storage latency tracking is part of the storage manager 20, running on a control server 16. The latency of the storage pools 18 is reported by ptdiskstats [14] and sent to the storage manager 20. As can be seen in FIG. 8, the latency tracking mechanism can successfully track the latency changes and report accurate latency value for the next period.

In the realm of time series analysis, embodiments of the subject system may use one or more of a variety of prediction methods, such as exponentially smoothing, moving average with different sizes of sliding window, and auto regression. Each may all serve the same purpose: to predict the future value by the history value. These are compared in detail with respect to FIG. 13 as follows.

Performance modeling consists of two parts: workload modeling and storage device modeling. The workload model can be constructed using its outstanding IOs (OIOs), I/O size, Read/Write Ratio, and Randomness. The workload model may be defined as:

$$WL_i = f(OIO, IO\text{size}, \text{Read Ratio}, \text{randomness}) \quad (2);$$

where the total workload on one storage pool is the summation of all $WL_i$ on that storage pool. To convert the total workload to storage latency, the following equation may be used:

$$L_{predict} = \frac{\Sigma WL_i}{\rho}; \quad (3)$$

where $\rho$ is calculated via the storage device model (L-Q model [4]). A workload injector may be used to proactively test the storage pool and build the L-Q model, when there is no job running in the system.

For workload modeling, LightSRM leverages the same model as described above with the exception that the performance models are built to support snapshot. According to the phases described above, the workload model is as follows. During the first phase of merging and fetching, additional I/O loads may be generated to all three storage pools as shown in FIG. 6. For storage pool 1, which hosts the base virtual disks, the additional workload WLA can be modeled as:

$$WLA_{sp1} = WLA_{Merge} + WLA_{fetch} = \quad (4)$$
$$f(1,512KB, 0\%, 0\%) + f(OIO, IOsize, 100\%, randomness)$$

For storage pool 2, which hosts the old snapshot, the additional workload WLA can be modeled as:

$$WLA_{sp2} = WLA_{Merge} + WLA_{fetch} = \quad (5)$$
$$f(1,512KB, 100\%, 0\%) + f(OIO, IOsize, 100\%, randomness)$$

For storage pool 3, which hosts the new snapshot, the additional workload WLA can be modeled as:

$$WLA_{sp3} = \quad (6)$$
$$WLA_{workload} + WLA_{fetch} = f(OIO, IOsize, \text{Read Ratio}, randomness) +$$
$$f(OIO, IOsize, 0\%, randomness)$$

As can be seen in equations (4) (5) (6), modeling the merging process may be relatively easy, because the data copy operation has fixed values of OIO, IOsize, Read Ratio, and Randomness for a given platform. On the other hand, the behavior of the fetch process totally depends on the workload behavior (OIO, IOsize, and Randomness). Read Ratio is 100% for storage 1, 2 (the sender) while 0% for storage 3 (the receiver).

During the second phase of merging or fetching, one of the merging and fetching process finishes. If merging process finishes, $WLA_{Merge}$ is set to 0. Otherwise, $WLA_{fetch}$ is set to 0.

During both the first and the second phases, additional I/O workload may be added to the workload model $WL_i$ in equation (2). After the second phase, the workload completely runs on destination, in which case equation (2) itself is adequate.

For the storage device modeling, we reverse the equation (3) to compute the device characteristics ρ as below:

$$\rho = \frac{\Sigma WL_i}{L} \quad (7)$$

where $\Sigma WL_i$ is computed using the I/O characteristic (OIO, IOsize, R/W ratio, randomness) and L is obtained from the last latency tracking period. Since the sampling period may be short (5 minutes in our prototype), the chance that ρ changes in the next period may be low. Besides, the storage latency and the workload I/O characteristics in equation (7) may be monitored during the sampling period. Therefore, device characteristic ρ can adjust itself in each sampling period, if the underlying device characteristics change.

In a traditional storage management system, ρ is initially obtained from an off-line device modeling. The workload injector adjusts ρ when the system is idle. LightSRM, however, uses the runtime performance data to recalibrate ρ online even when the system is busy running applications.

Embodiments of the subject system, such as, LightSRM, can use the performance data monitored in the last tracking period to calculate the device characteristics, where the chance that ρ changes in such short period is low. In addition, the system may recalibrate ρ in each period, such that the device characteristics change can be captured in a timely manner. Given that the system has derived a workload model for snapshots and storage device characteristics, the model can predict the latency changes when the workloads are rearranged among the storage pools. A load balance algorithm, such as described below, can benefit from this feature.

Figure 9:
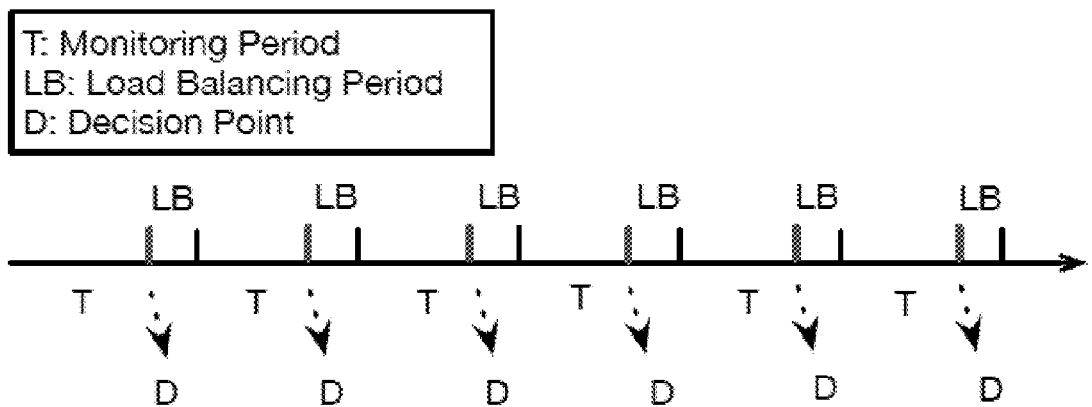
FIG. 9 displays a timeline for the time sequence of LightSRM load balancing.

FIG. 9 displays a timeline for the time sequence of LightSRM load balancing. The goal of load balancing is to optimize resource utilization, minimize storage latency by distributing workloads across storage pools. LightSRM pursues the same goal but in a fine-grained way. FIG. 9 shows a visual view of how LightSRM performs in real time. In a monitoring period (T), all performance characteristics and storage latency may be sampled. At decision point (D), the latency prediction for next period is computed, as described in more detail. The system acquires all the performance data (e.g. OIO, IOsize, etc.) during the monitoring period. Performance models, such as the performance models described herein, are used to predict the possible performance if a certain workload is moved to another storage pool. Based on the performance data, policy based storage management algorithm (e.g., load balancing) may be executed. In the load balance (LB) period, the system actually moves the workload.

For load balancing, LightSRM iteratively performs the following 3 steps: 1) find the storage pool with the maximum latency (max_storage) and the storage pool with minimum latency (min_storage) in the sliding window; 2) use the performance model (as noted herein) to check if one of the virtual disks moved from max_storage to min_storage will lower the average storage latency and the latency difference across storage pools; and 3) if yes, add this move to migration list and update the internal database to record this movement. If no, quit the iteration and output the migration list. The iteration will continue until a further move to further lower the storage latency is no longer found.

When the load balance algorithm is completed, the system may generate a list of migration suggestions, where either the snapshot process or the migration process is indicated as the best process of operation. Notably, the copy-on-write/read snapshot may not be the best option to apply to all I/O request, where the system may recognize that the transition time of migration could actually be shorter than that of a snapshot for some small virtual disks. Accordingly, specific embodiments of the subject system and method for storage resource management use a hybrid method, which selects the migration process if the migration time is shorter and selects the snapshot process if the snapshot transition time is shorter. To estimate the transition time of the snapshot and migration processes, the following functions apply:

$$TransitionTime_{snapshot} = \max\{Time_{Fetching}, Time_{Merging}\} =$$
$$\max\left\{\frac{SnapshotSize}{Throughput_{appRead}}, \frac{SnapshotSize}{Throughput_{merge}}\right\}$$

where SnapshotSize is the size of snapshot file, $Throughput_{merge}$ is the throughput that merge process can get, and $Throughput_{appRead}$ is the throughput that workload generates. Note that the behavior of fetch process depends on the workload. When workload reads the data, the fetch process will read data from old storage pool.

$$TransitionTime_{migration} = \frac{VirtualDiskSize + WorkingSetSize}{Throughput_{migration}}$$

where VirtualDiskSize is the size of entire virtual disk; $Throughput_{migration}$ is the throughput associated with the migration process. According to the implementation of migration, the system may also copy the data that is changed by the application during the migration (working set data). Thus, WorkingSetSize may also be considered. For each suggestion on the migration list, LightSRM calculates the transition time of both the migration and snapshot processes. Then, LightSRM selects the method that has a shorter transition time. By doing this, LightSRM can always choose the fastest way to perform load balance.

Experimentation

Experimental Setup

To evaluate LightSRM, a testbed consisting of six storage pools is built, each of which has a different configuration, as shown in Table 2. The storage pools are connected to servers through Fiber Channel. All the six storage pools are shared by Dell Power Edge r710 servers, which are equipped with 2.4 GHz Intel® Xeon® CPU and 24 GB memory. The operating system on the hosts is Ubuntu 13.04. The kernel version is 3.11.0-12 with kvm modules enabled. The latest QEMU version 1.7.50 is used. Up to 16 virtual machines were generated, each of which has 1 vCPUs and 1 GB memory. Their virtual disks are placed across the six storage pools. The size of the virtual disks ranges from 16 GBs to 1 TBs. The storage manager of LightSRM may run on a Dell Desktop Optiplex 980 with 2.7 GHz Intel Core i7 and 8 GB memory. The communication between the storage manager and the QEMU/KVM servers is supported by libvirt, version 1.2.1 [15].

Implementation

A specific embodiment of LightSRM has two parts: copy-on-write/read snapshot and storage manager. The QEMU block device driver (qemu/block.c) is modified to support both copy-on-write and copy-on-read at the same time. To monitor the virtual machine I/O characteristics (e.g. outstanding IOs, IOsize, Read/Write ratio, and randomness), several performance counters in QEMU block device driver are instrumented. These characteristics can be obtained via either QEMU command line interface (qmp) or libvirt API. In order to track the storage performance, we use pt-diskstats tool [14] can be used, which can report the real time storage latency and throughput. The storage manager, including performance modeling and load balancing, is implemented in C. The storage manager runs on a separated machine and leverages the libvirt API to communicate with QEMU hosts and storage pools. For comparison, the Pesto scheme [4] is also implemented on this QEMU/KVM platform.

TABLE 2

Storage pool configurations

|  | No. of disks | Interface | RAID Level | Disk Size | Vendor |
|---|---|---|---|---|---|
| Storage_1 | 2 | FC | 1 | 2 TB | IBM |
| Storage_2 | 3 | FC | 5 | 2 TB | IBM |
| Storage_3 | 2 | FC | 0 | 1.3 TB | IBM |
| Storage_4 | 2 | FC | 1 | 0.7 TB | IBM |
| Storage_5 | 5 | FC | 5 | 2.7 TB | IBM |
| Storage_6 | 4 | FC | 10 | 2 TB | IBM |

Workloads and Metrics

On the testbed, two hadoop platforms are deployed, which occupy up to ten virtual machines in total. On the hadoop platform, hibench suite [11] is run as big data applications. Six virtual machines are also created with IOmeter [31] installed to mimic the I/O behavior of traditional server applications. The behaviors are summarized in Table 3, which are also used and verified in several prior studies [3, 4, 5, 28]. In general, a multi-tenant cloud environment is mimicked with two hadoop clusters running regularly. The cloud tenant can also schedule their server applications to run at any time. In the evaluation section, several execution scenarios are created based on this setup.

TABLE 3

IOmeter settings for simulated workloads

| Type | OIO | IO Size | Read Ratio | Randomness |
|---|---|---|---|---|
| Workstation | 8 | 8 | 80% | 80% |
| OLTP | 12 | 8 | 70% | 100% |
| Exchange | 8 | 4 | 67% | 100% |

In order to compare LightSRM with other alternative designs, an evaluation is performed for the following metrics: 1) transition time, which is the time between the workload is scheduled to move and the workload completely runs on destination; 2) application observed latency, which is used to measure the performance impact of performing storage management; 3) distribution of errors/residuals, which is used to measure the accuracy of the prediction and modeling; 4) storage latency of each storage pool, which is used to show how well the LightSRM design can rebalance the storage performance.

Results and Analysis

Transition Time

As discussed herein, the transition time of snapshot can be longer than the migration time when the virtual disk size is small enough. This section analyzes the factors that determine the transition time.

For snapshot, the transition time is the maximum value of merging time and fetching time. Since the merging process copied the data from old snapshot to the base virtual disk, the merging time is determined by the working set size of the workload. Fetching time is determined by both the working set size and the read throughput of the workload. Higher read throughput leads to more data to be fetched.

Figure 10:
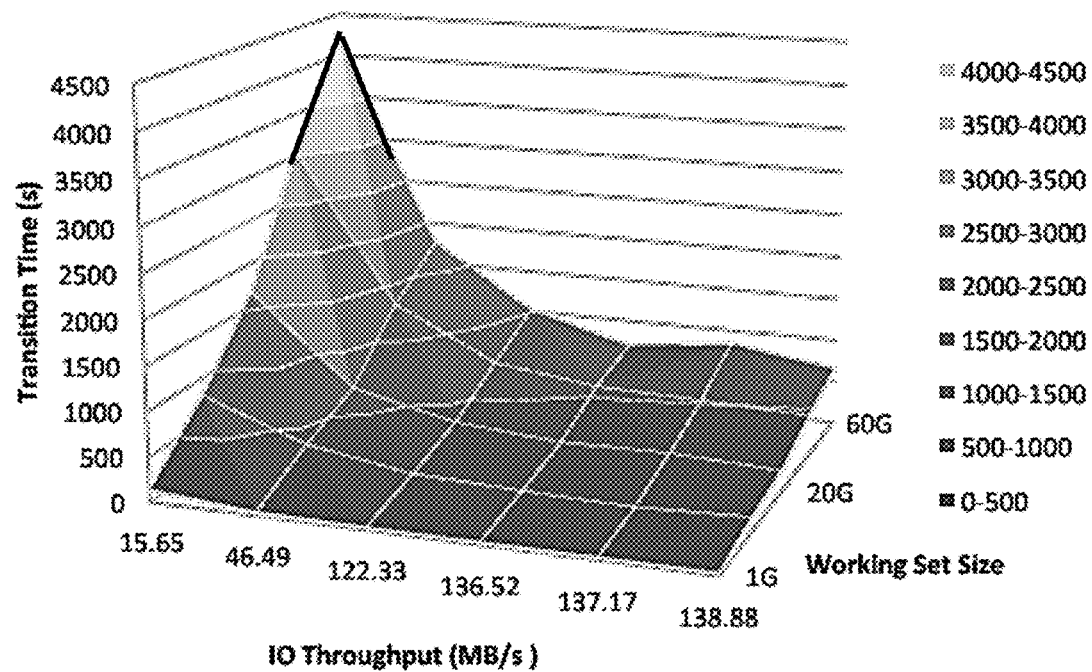
FIG. 10 displays a Three-Dimensional (3D) graphical representation of the transition time with respect to the working set size and I/O throughput, when using copy-on-write and copy-on-read snapshots.

FIG. 10 displays a Three-Dimensional (3D) graphical representation of the transition time with respect to the working set size and I/O throughput, when using copy-on-write and copy-on-read snapshots. The transition time of snapshot with different working set sizes and throughputs was measured. First, the larger the read throughput, the shorter the transition time at a given working set size. With larger read throughput, the volume of data that is driven to the new snapshot per second is larger, which inevitably leads to faster fetching process. In contrast, the larger the working set size, the longer the transition time. Both merging and fetching process need more time to copy a larger size of working set data.

Figure 11:
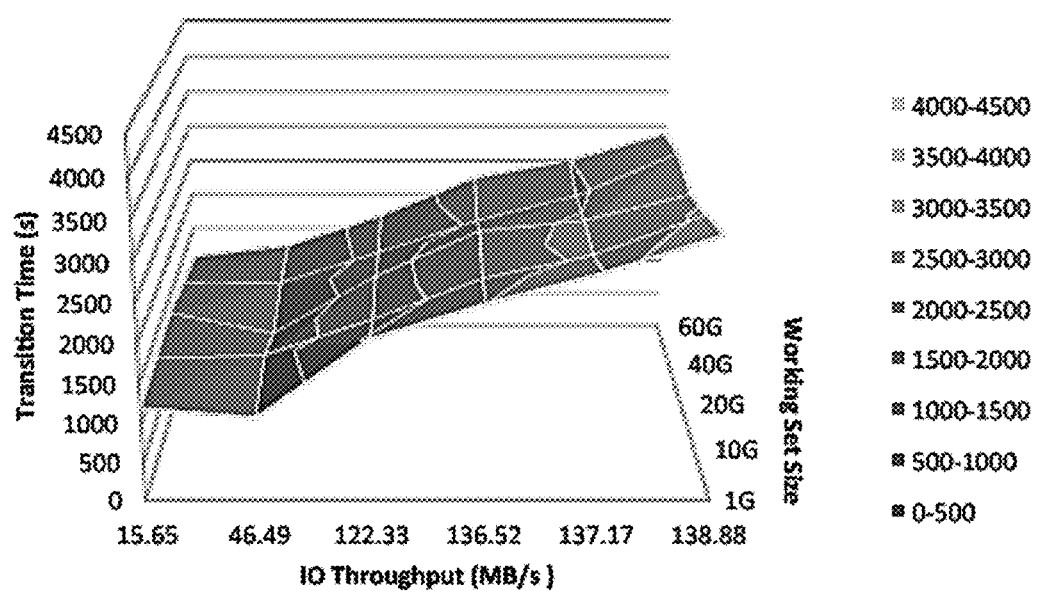
FIG. 11 shows a 3D graphical representation of the transition time with respect to the working set size and I/O throughput, when using migration.

FIG. 11 shows a 3D graphical representation of the transition time with respect to the working set size and I/O throughput, when using migration. For migration, the transition time depends on the virtual disk size and size of the data that is modified during the copy process. As can be seen in FIG. 11, larger throughput leads to longer migration time. With larger throughput, the volume of modified data is larger during the copy process. The migration process has to retransmit those modified data. Therefore, the higher the workload write throughput, the longer the transition time.

Cross-examining FIGS. 10 and 11, snapshot method is preferable when workload exhibits higher read throughput and has smaller working set size, and migration method is more efficient than snapshot method when the workload exhibits lower write throughput. In modern data centers, which host multi-tenant public clouds, the workload exhibits variable working set sizes and different I/O behaviors. Therefore, a hybrid method that can dynamically choose a faster method (snapshot or migration) online, as discussed herein, can be beneficial.

Performance Impact on Workloads

Figure 12A:
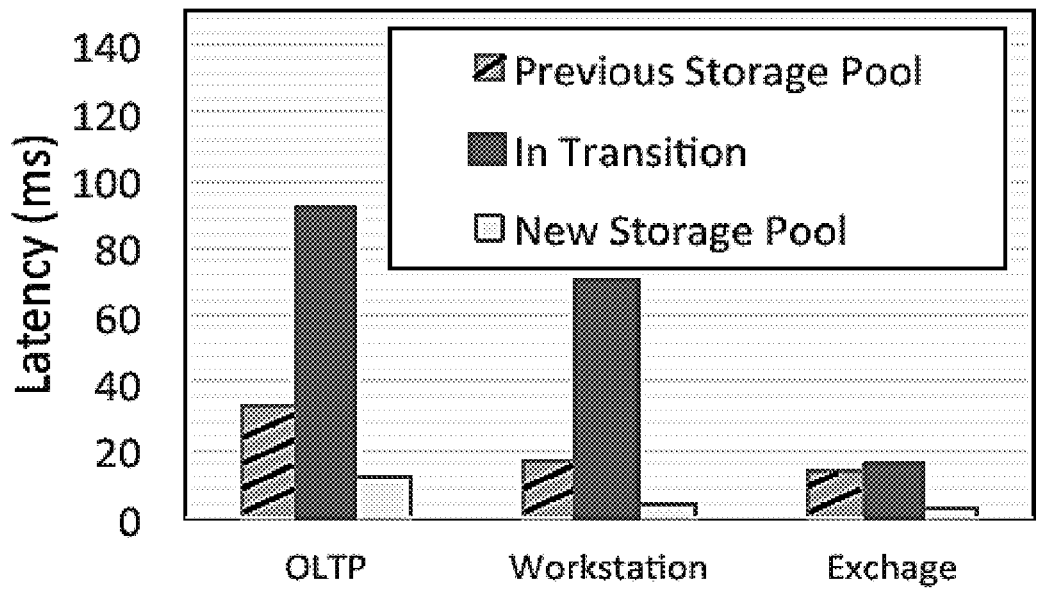
FIGS. 12A-B show bar charts for the performance impact on workloads using: (a) migration and (b) snapshots.
Figure 12B:
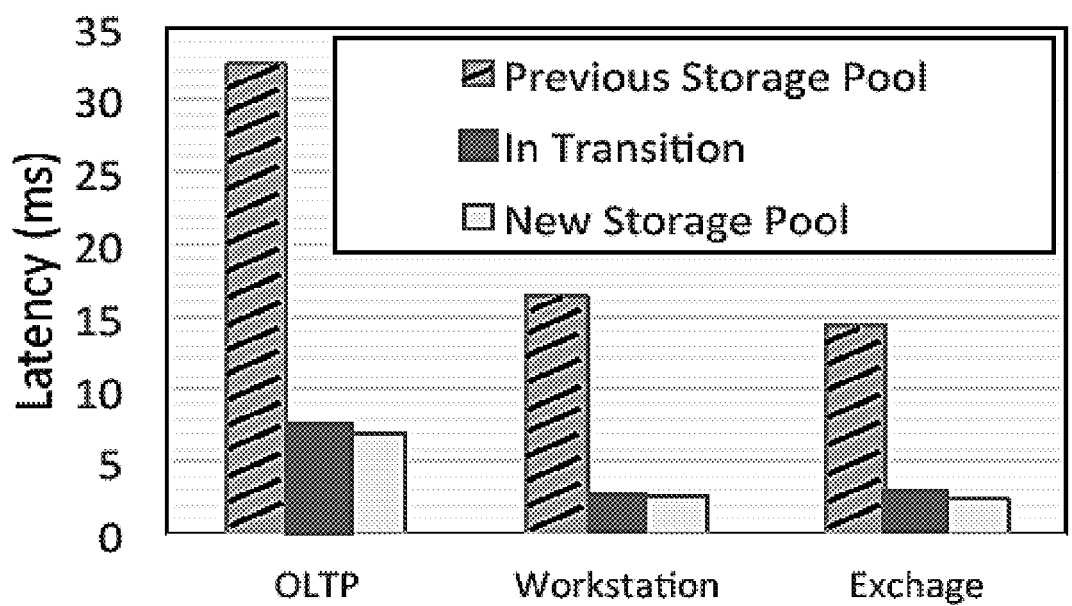

FIGS. 12A-B show bar charts for the performance impact on workloads, where FIG. 12A shows the performance impact on workloads using migration and FIG. 12B shows the performance impact on workloads using snapshots. Both snapshot and migration technology have impact on the workload performance. They both generate additional disk traffic, which will compete the storage resources with the currently running workloads. The observed latency changes of the workloads were measured during the performance of the snapshot process and migration. Three different types of workloads were run (e.g., OLTP, Workstation, and Exchange). At the beginning, they are running on a slow storage pool. These were planned to move to a faster storage pool.

FIG. 12A shows the latency changes, when the workload was moved using storage migration. As can be seen, the workload latency jumps as much as 4× during the migration although eventually the latency drops as the migration finishes. The copy process of the migration occupies the disk resources on both source and destination storage, which inevitably leads to low performance of the running application.

FIG. 12B shows the latency changes, when the workload was moved using the snapshot process. The latency observed by the workload during the transition is between the latency of the slow and fast storage pool. The moment the snapshot is taken, all the write requests of the workload are served by new storage pool. The new storage pool will serve the read requests after the first batch of read requests. Besides, the merging time is much shorter than the migration time so that the impact on the workload latency is smaller (on average, 90% less overhead in the experiments).

Accuracy of Latency Prediction

Figure 13:
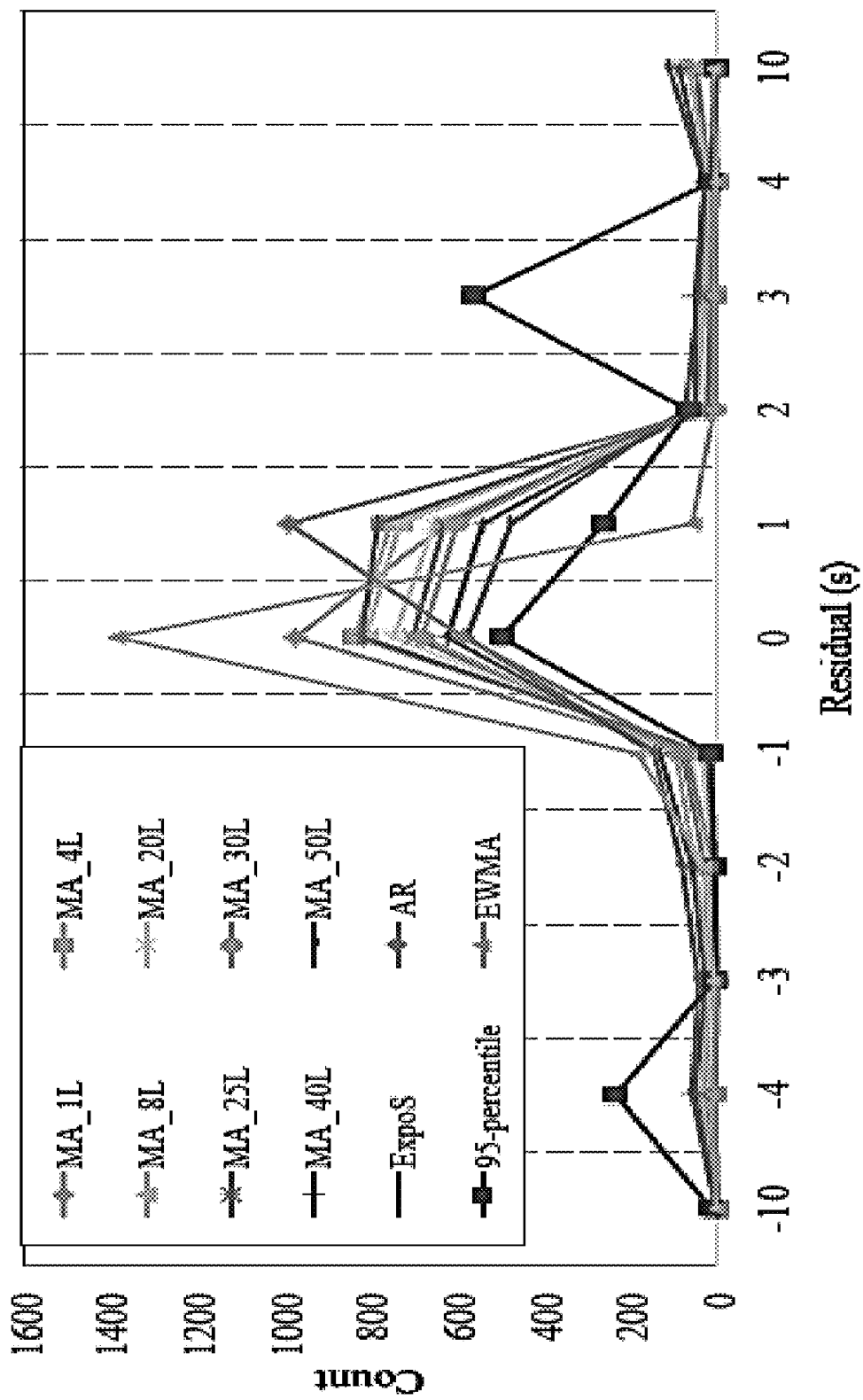
FIG. 13 illustrates a graphical representation of the distribution of Residuals with respect to count.
Figure 14:
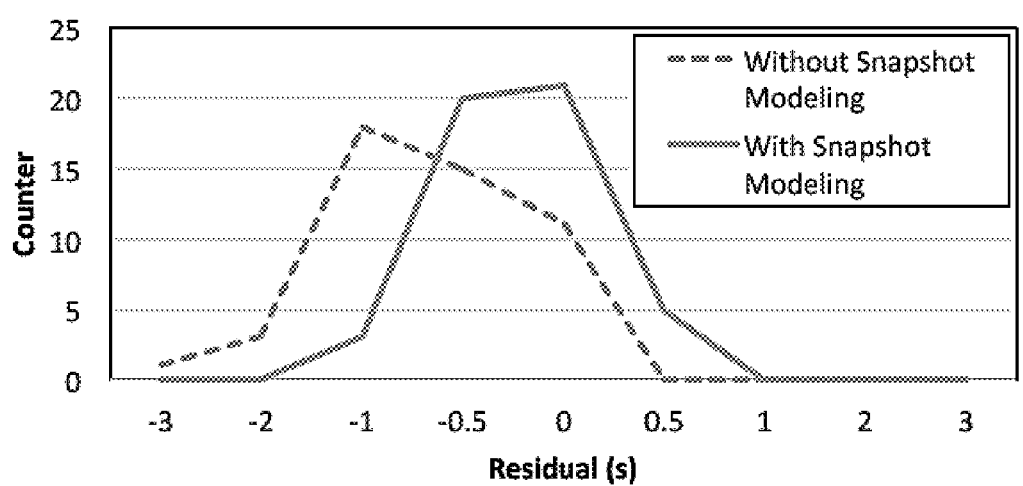
FIG. 14 illustrates a graphical representation of the distribution of Residuals with respect to count for both snapshot modeling and without snapshot modeling.

FIG. 13 illustrates a graphical representation of the distribution of Residuals with respect to count; while FIG. 14 illustrates a graphical representation of the distribution of Residuals with respect to count for both snapshot modeling and without snapshot modeling. There are two predictions in LightSRM: (1) latency prediction for the next period and (2) latency prediction when a certain virtual disk is moved. The traditional method uses the 95-percentile of the latency samples as the latency value of next period. The LightSRM uses exponentially weighted moving average (EWMA) with adjustable window size to predict the storage latency. In time series analysis, exponential smoothing (ExpoS), moving average with different lags (MA_xL), and auto regression (AR) can also be utilized to do prediction. FIG. 13 shows the distribution of residuals when different prediction methods are used. An accurate prediction will have a distribution graph that is close to 0. In FIG. 13, MA_xL means weighted moving average is used with a window length of x. As can be seen, the traditional way of prediction (95-percentile) yields the most inaccurate prediction results, whose residuals are mostly far away from 0. MA_xL, AR and ExpoS yield similar results. EWMA with adjustable window shows the most accurate results as most of the residuals are around 0.

FIG. 14 shows the prediction residuals when a snapshot is created on the new storage pool. As can be seen, without snapshot modeling, most of the residuals are negative, which means most of the prediction value is lower than the actual latency. When the snapshot model is used to capture the additional traffic generated by snapshots, the residuals are closer to 0. Therefore, LightSRM can accurately capture the system performance by modeling the snapshots.

Storage Policy-Based Management for Big Data Workloads

Figure 15A:
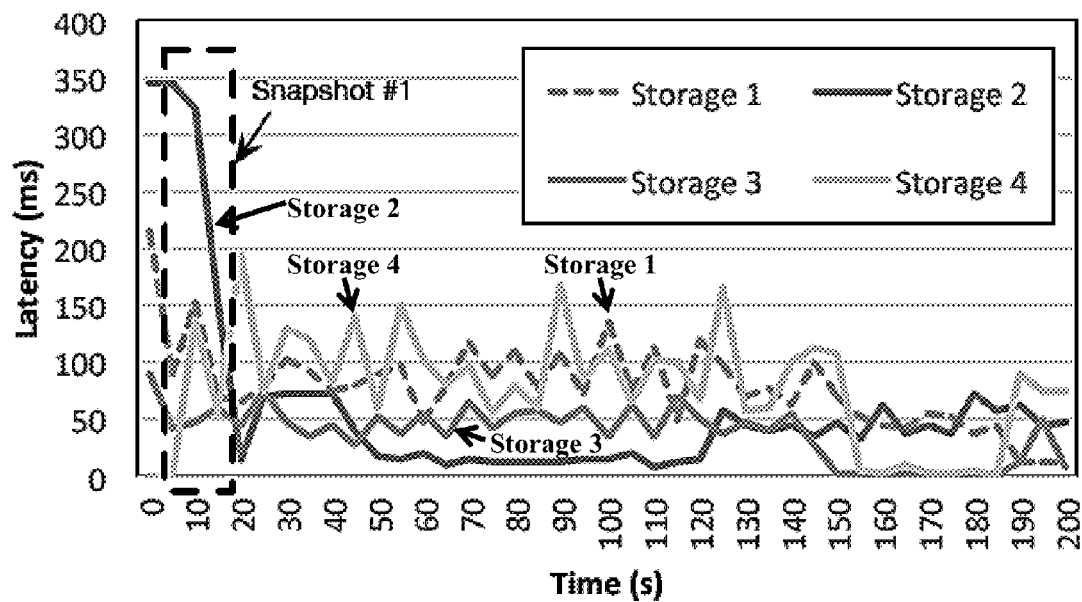
FIGS. 15A-B displays a graphical representation of the Storage Performance Load Balance for: (a) LightSRM (snapshot) and (b) Traditional Method (migration).
Figure 15B:
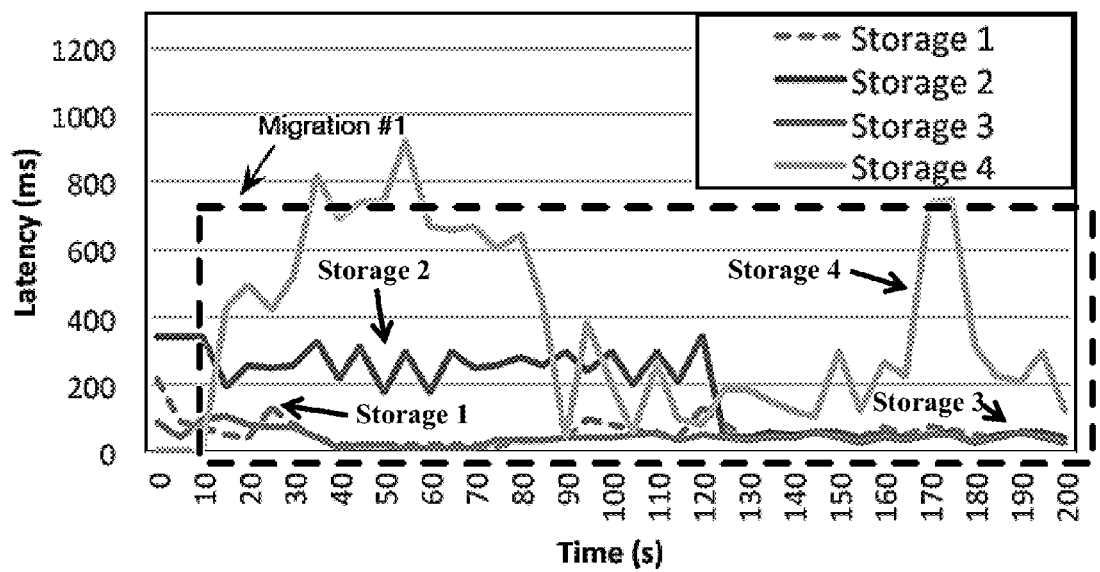

FIGS. 15A-B display a graphical representation of the Storage Performance Load Balance, where FIG. 15A shows the storage performance load balance for LightSRM (snapshot) and FIG. 15A shows the storage performance load balance for the Traditional Method (migration). The LightSRM is deployed in a big data cloud environment, where two execution scenarios to test how well LightSRM performs were designed: Case #1 Performance Imbalance at Beginning and Case #2: Unexpected Scheduled Jobs. With respect to the first case, in a storage system with four storage devices (storage 1~4 in Table 2), one VM is placed on storage 1, two VMs are placed on storage 2, one VM is placed on storage 3, and no VM is placed on storage 4. The size of virtual disks may range from 400 GB to 1 TB. The PageRank from hibench suite in the virtual machines may be run. So, at the beginning, the system is imbalanced (storage 2 is overloaded while storage 4 is idle).

As can be seen in FIG. 15A, LightSRM detects the imbalance at the beginning and decides to move one of the VMs from storage 2 to storage 4. Since the virtual disk size is large, taking snapshots will be faster. LightSRM makes a snapshot on storage 4 so that the performance is quickly balanced as shown in FIG. 15A. Here, it is notable that most of big data workloads tend to read the data at the beginning of execution. Therefore, the transition time of snapshot is very short because the workload fetches the data it needs quickly to the new location. If the migration method is used as in the traditional method in FIG. 15B, the migration time is very long due to the large size of the virtual disk. As can be seen, the migration cannot even finish within the workload execution. The performance of storage pools remains imbalanced until the end of workload execution.

Figure 16:
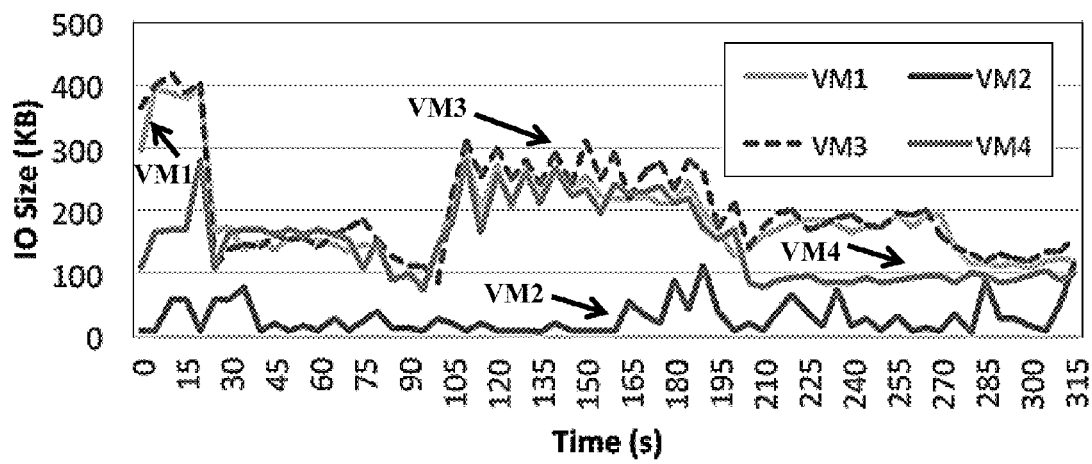
FIG. 16 displays a graphical representation of the I/O size of PageRank during the execution with respect to time.

FIG. 16 displays a graphical representation of the I/O size of PageRank during the execution with respect to time. Investigating the application behavior, it is notable that big data workloads tend to have large I/O size and different I/O pattern among computing nodes (virtual machines). Assuming network bandwidth is not saturated, large I/O size usually leads to high disk throughput, which helps to copy the data to the new location when using snapshots. Therefore, in general, using snapshot to tune performance is preferable in the light of big data workloads. However, as can be seen in the PageRank example (shown in FIG. 16), the I/O behavior of big data application varies across different virtual machines during the execution process. Therefore, it can be desirable to introduce the hybrid method, as described herein and implemented in a specific embodiment of LightSRM, which can dynamically choose a faster tuning method based on the workload behavior.

Figure 17:
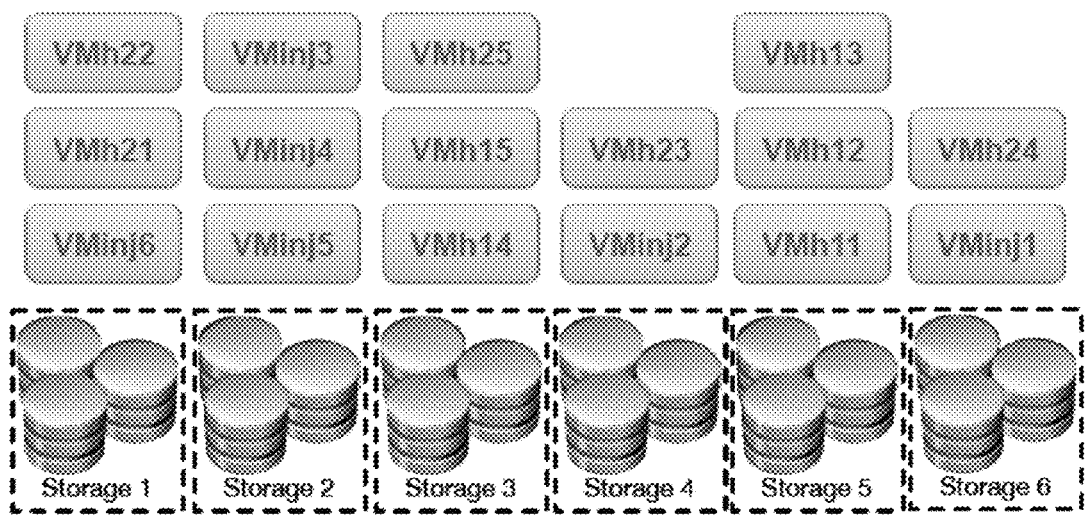
FIG. 17 shows a block diagram of the initial virtual disk placement.

FIG. 17 shows a block diagram of the initial virtual disk placement. As shown in FIG. 17, two sets of hadoop platform (VMh11~VMh15, VMh21~VMh25) are deployed on six storage pools. There are also six VMs (VMinj1~VMinj6) installed with IOmeter. Initially, there are all idle and balanced. In the experiments, the hibench suite is run on both hadoop platforms. At a certain time during the execution, three VMs from VMinj1~VMinj6 are randomly selected to run IOmeter with traditional server application configurations as shown in Table 3. The virtual disk sizes for VMh1$x$ and VMh2$x$ are ranging from 200 GB to 1 TB while the size for VMinj$x$ is 16 GB. Therefore, we intentionally create a scenario that some VMs are potentially suitable for migration, while others are not.

Figure 18A:
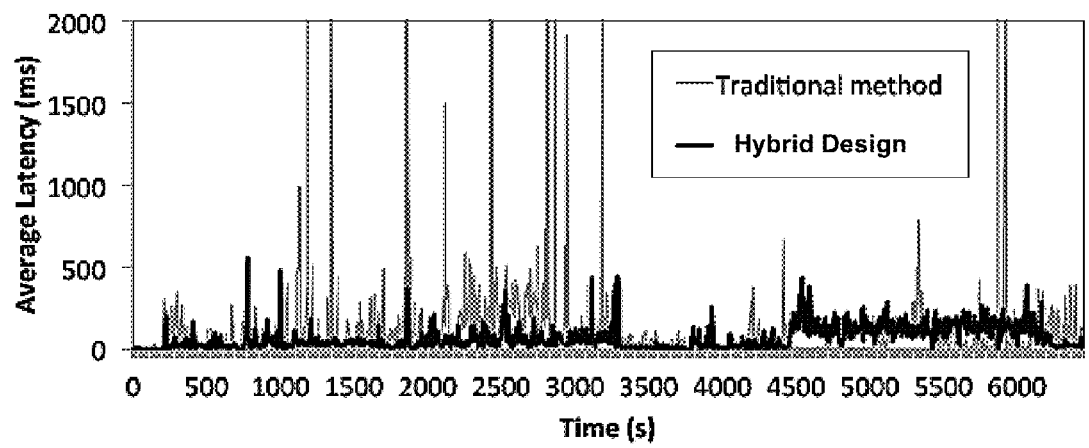
FIG. 18A displays a graphical representation of the average latency of the storage pools with respect to time.
Figure 18B:
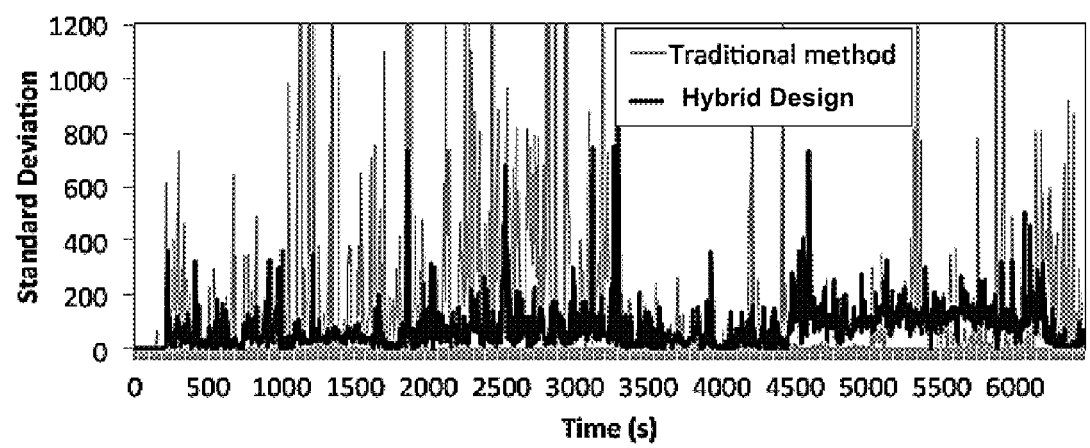
FIG. 18B displays a graphical representation of the standard deviation of the latency across all the storage pools with respect to time.

FIG. 18A displays a graphical representation of the average latency of the storage pools with respect to time, and FIG. 18B displays a graphical representation of the standard deviation of the latency across all the storage pools with respect to time. As known, the traditional management scheme uses migration for during movement of all data, even if the virtual disk is very large, such as VMh$x$. An embodiment of LightSRM implementing the hybrid method described herein, can dynamically choose a suitable way to relocate virtual disks. FIG. 18A shows the average latency of the six storage pools, which will exhibit value jump if suddenly scheduled job is not handled in time. FIG. 18B shows the standard deviation for the latency of the six storage pools, which reflects how well the storage pools are balanced. As can be seen, LightSRM has 91% lower average storage latency (28 ms) than that of the traditional method (312 ms). Besides, LightSRM shows 93% lower standard deviation (49 ms) across storage pools. Further looking into the reason behind those numbers, LightSRM takes two snapshots, for the large size VMs, and uses three migrations, for small size VMs, as shown in Table 4. As can be seen in Table 4, the transition time of making those moves are relatively short. However, the traditional method takes around 1 hr to migrate the large size virtual disk (VMh21, VMh22). These lengthy migrations yield high I/O traffic in the system, which leads to high latency in the system (as shown in FIG. 18A). Worse, the randomly scheduled VMs are not handled timely, which results in highly imbalanced storage system as shown in FIG. 18B. Therefore, LightSRM is more capable in handling situations with both large and small size virtual disks.

TABLE 4

Load balance suggestions (rounds with no suggestions are excluded)

| Round | Balancing Decisions | Time |
|---|---|---|
| 2 | Snapshot VMh22 from Storage 1 to 2 | 12 s |
| 4 | Migrate VMinj3 from Storage 2 to 5 | 85 s |
|   | Migrate VMinj4 from Storage 2 to 6 | 70 s |
| 9 | Snapshot VMh21 from Storage 1 to 3 | 39 s |
| 15 | Migrate VMinj1 from Storage 6 to 1 | 71 s |

Figure 19:
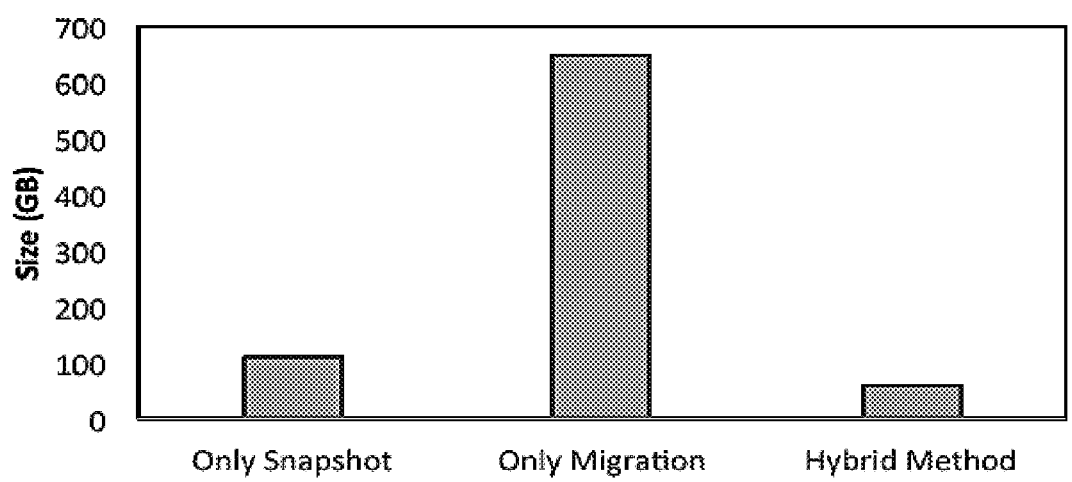
FIG. 19 shows a bar chart of the data traffic generated by load balance.

FIG. 19 shows a bar chart of the data traffic generated by load balancing management. In particular, FIG. 19 shows the additional data traffic that is generated by the load balancing management. When migration is used, the additional data traffic will be roughly equal to the sum of sizes of migrated virtual disks. When snapshot is used, the additional data traffic is the double of the workload working set size (one for merging process, one for fetching process). If virtual disk size is smaller than double working set size, migration actually yields less additional traffic. Therefore, using a hybrid method, as shown in FIG. 19, can achieve much less data traffic than other methods (44% less than the snapshot method and 91% less than the migration method in the experiment).

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

The methods and processes described herein can be embodied as code and/or data. The software code and data described herein can be stored on one or more computer-readable media or machine-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] VMware Storage Distributed Resource Scheduler, http://www.vmware.com/products/vsphere/features-storagedrs.

[2] VMware Distributed Resource Scheduler, http://www.vmware.com/products/vsphere/features-drs-dpm.

[3] Ajay Gulati, Chethan Kumar, Irfan Ahmad, and Karan Kumar, BASIL: Automated I/O load balancing across storage devices. USENIX, FAST 2010.

[4] Ajay Gulati, Ganesha Shanmuganathan, Irfan Ahmad, Carl Waldspurger, and Mustafa Uysal, Pesto: Online storage performance management in virtualized datacenters. SOCC 2011.

[5] Nohhyun Park, Irfan Ahmad, and David Lilja, Romano: Autonomous Storage Management using Performance Prediction in Multi-Tenant Datacenters, SOCC 2012.

[6] Ali Mashtizadeh, Emr'e Celebi Tal Garfinkel, and Min Cai, The Design and Evolution of Live Storage Migration in VMware ESX, USENIX ATC, 2011.

[7] Jayanta Basak, Kushal Wadhwani, Kaladhar Voruganti, Srinivasan Narayanamurthy, Vipul Mathur, Siddhartha Nandi, Model Building for Dynamic Multi-tenant Provider Environments, ACM SIGOPS Operating Systems Review, 2012.

[8] Mengzhi Wang, Kinman Au, Anastassia Ailamaki, Anthony Brockwell, Christos Faloutsos, and Gregory R. Ganger, Storage Device Performance Prediction with CART Models, MASCOT 2014.

[9] Aameek Singh, Madhukar Korupolu, Dushmanta Mohapatra, Server-Storage Virtualization: Integration and Load Balancing in Data Centers, High Performance Computing, Networking, Storage and Analysis, 2008.

[10] Hadoop, http://hadoop.apache.org.

[11] Hibench, https://github.com/intel-hadoop/HiBench.

[12] QEMU, http://wiki.qemu.org.

[13] KVM, http://www.linux-kvm.org/page/Main_Page.

[14] pt-diskstats. http://www.percona.com/doc/percona-toolkit/2.1/pt-diskstats.html.

[15] Libvrit 1.2.1, http://libvirt.org.

[16] Amazon AWS, http://aws.amazon.com.

[17] Azure, http://www.azure.microsoft.com/en-us/.

[18] Oracle Information Architecture: An Architect's Guide to Big Data, An Oracle White Paper in Enterprise Architecture, August 2012.

[19] Swaroop Kavalanekar, Bruce Worthington, Qi Zhang, Vishal Sharda, Characterization of storage workload traces from production Windows Servers, IISWC 2008.

[20] Ajay Gulati, Chethan Kumar, Irfan Ahmad, Storage Workload Characterization and Consolidation in Virtualized Environments, VPACT, 2009.

[21] Eric Anderson, and et al., Hippodrome: running circles around storage administration, FAST 2002.

[22] George Alvarez, et al., MINERVA: An Automated Resource Provisioning Tool for Large-Scale Storage Systems, ACM transactions on computer systems, 2001.

[23] Chenyang Lu, Guillermo Alvarez, John Wilkes, Aqueduct: online data migration with performance guarantees, USENIX, FAST 2002.

[24] Bhaskar Prasad Rimal, Eunmi Choi, Ian Lumb, A Taxonomy and Survery of Cloud Computing System, Fifth International Joint Conference on INC, IMS and IDC, 2009.

[25] Divyakant Agrawal, Sudipto Das, Amr El Abbadi, Big data and cloud computing: current state and future opportunities, EDBT/ICDT, 2011.
[26] Xuelian Lin, Zide Meng, Chuan Xu, Meng Wang, A Practical Performance Model for Hadoop MapReduce, Cluster Computing Workshops, 2012.
[27] Herodotos Herodotou, Hadoop Performance Models, Technical Report, CS-2011-05, Duke University, http://www.cs.duke.edu/starfish/files/hadoop-models.pdf.
[28] Wang, L. Workload configurations for typical enterprise workloads. Technical Report, Microsoft, 2009.
[29] Ruijin Zhou, Fang Liu, Chao Li, Tao Li, Optimizing virtual machine live storage migration in heterogeneous storage environment, VEE, 2013.
[30] Arkaitz Ruiz-Alvarez, Marty Humphrey, An Automated Approach to Cloud Storage Service Selection, Science-Cloud 2011.
[31] IOmeter, http://www.iometer.org.
[32] Carl A. Waldspurger. Memory Resource Management in VMware ESX Server, OSDI 2002.
[33] Minkyong Kim, and Brian Noble. "MobileNetworkEstimation," Proc. Seventh Annual International Conference on Mobile Computing and Networking, July 2001

What is claimed is:

1. A system for storage resource management, comprising:
a plurality of storage pools;
at least one server, wherein each server of the at least one server comprises a corresponding processor of a corresponding at least one processor and a corresponding memory of a corresponding at least one memory, wherein each server of the at least one server is connected to the plurality of storage pools,
wherein a virtualized server is implemented on a server of the at least one server, wherein the virtualized server has a plurality of base virtual disks, wherein the virtualized server has a plurality of snapshots on top of the plurality of base virtual disks such that each snapshot of the plurality of snapshots is on top of a corresponding base virtual disk of the plurality of base virtual disks, wherein the plurality of snapshots is a plurality of copy-on-write/read snapshots,
wherein the plurality of base virtual disks and the plurality of copy-on-write/read snapshots are on the plurality of storage pools,
wherein the virtualized server implements a copy-on-write/read snapshot creation process with respect to a specific base virtual disk stored on an initial storage pool of the plurality of storage pools and an existing snapshot stored in an old storage pool of the plurality of storage pools, such that the copy-on-write/read snapshot creation process creates a new snapshot on a new storage pool of the plurality of storage pools, wherein the existing snapshot corresponds to the specific base virtual disk stored on an initial storage pool, wherein the new storage pool is different from the old storage pool,
wherein after creation of the new snapshot,
(i) the existing snapshot becomes an old snapshot,
(ii) the copy-on-write/read snapshot creation process initiates a merge, and
(iii) the copy-on-write/read snapshot creation process initiates a fetch,
such that until either the merge or the fetch is completed,
the merge comprises merging data from the old snapshot stored on the old storage pool with the specific base virtual disk stored on the initial storage pool, wherein received write requests with respect to the specific base virtual disk are directed to the new snapshot and writes with respect to the specific base virtual disk are written to the new snapshot, and
the fetch comprises received read requests with respect to the specific base virtual disk are directed to the new snapshot such that
(a) before a data block of the specific base disk is fetched to the new snapshot, in response to a read request with respect to the data block triggers the new snapshot to fetch latest data for the data block from either the old snapshot or the specific base virtual disk,
(b) after the data block is fetched to the new snapshot, further read request with respect to the data block is read from the data block fetches to the new snapshot,
wherein after either the merge or the fetch is completed, and until both the merge and the fetch are completed,
(i) if the merge is completed and the fetch is not completed, the merge terminates and the fetch continues,
(ii) if the fetch is completed and the merge is not completed, the fetch terminates and the merge continues,
wherein after both the merge and the fetch are completed, write requests and read requests with respect to the specific base virtual disk are sent to the new snapshot and are completely run on the new storage pool.

2. The system according to claim 1, wherein each base virtual disk of the plurality of base virtual disks corresponds to a virtual machine of a plurality of virtual machines, wherein the at least one server comprises:
a centralized data center management server, wherein a storage manager is implemented on the centralized data center management server, wherein the storage manager monitors input/output (IO) characteristics of the plurality of virtual machines, wherein the centralized data center management server is connected to each other server of the at least one server and is coupled to the virtualized server, wherein the storage manager provides instructions to the virtualized server regarding imitating the copy-on-write/read snapshot creation process, including identification of the new storage pool.

3. The system according to claim 2, wherein the storage manager implements performance tracking and performance load balancing based on the monitored IO characteristics of the plurality of virtual machines.

4. The system of claim 3, wherein the storage manager implements capacity prediction and capacity planning based on the monitored IO characteristics of the plurality of virtual machines.

5. The system according to claim 3, wherein performance tracking tracks storage latency using dynamic sliding window tracking that samples latency of each storage pool for q times and uses a latency prediction method to predict the storage latency.

6. The system of claim 5, wherein the latency prediction method is an exponentially weighted moving average (EWMA) method.

7. The system of claim 5, wherein the latency prediction method is an exponentially smoothing method.

8. The system of claim 5, wherein the latency prediction method is an auto regression method.

9. The system according to claim 1, wherein each snapshot of the plurality of snapshots holds a corresponding working set of running applications with respect to the corresponding base virtual disk.

10. A method of storage resource management, comprising:
  providing a plurality of storage pools,
  providing at least one server, wherein each server of the at least one server comprises a corresponding processor of a corresponding at least one processor and a corresponding memory of a corresponding at least one memory, wherein each server of the at least one server is connected to the plurality of storage pools,
  implementing a virtualized server on a first server of the at least one server, wherein the virtual server has a plurality of base virtual disks, wherein the virtualized server has a plurality of snapshots on top of the plurality of base virtual disks such that each snapshot of the plurality of snapshots is on top of a corresponding base virtual disk of the plurality of base virtual disks, wherein the plurality of snapshots is a plurality of copy-on-write/read snapshots,
  storing the plurality of base virtual disks and the plurality of snapshots on the plurality of storage pools,
  implementing a copy-on-write/read snapshot creation process with respect to a specific base virtual disk stored on an initial storage pool of the plurality of storage pools and an existing snapshot stored in an old storage pool of the plurality of storage pools, such that the copy-on-write/read snapshot creation process creates a new snapshot on a new storage pool of the plurality of storage pools, wherein the existing snapshot corresponds to the specific base virtual disk stored on an initial storage pool, wherein the new storage pool is different from the old storage pool,
  wherein after creation of the new snapshot,
  (i) the existing snapshot becomes an old snapshot,
  (ii) the copy-on-write/read snapshot creation process initiates a merge, wherein the merge comprises merging data from the old snapshot stored on the old storage pool with the specific base virtual disk stored on the initial storage pool, wherein write requests received are directed to the new snapshot with respect to the specific base virtual disk,
  (iii) the copy-on-write/read snapshot creation process initiates a fetch, where the fetch comprises sending read requests to the new snapshot such that
    (i) before a data block of the specific base disk is fetched to the new snapshot, in response to a read request with respect to the data block triggers the new snapshot to fetch latest data for the data block from either the old snapshot or the specific base virtual disk,
    (ii) after the data block is fetched to the new snapshot, further read request with respect to the data block is read from the data in the new snapshot,
  until either the merge or the fetch is completed,
  wherein after either the merge or the fetch is completed,
  (i) if the merge is completed and the fetch is not completed, the merge terminates and the fetch continues,
  (ii) if the fetch is completed and the merge is not completed, the fetch terminates and the merge continues,
  until both the merge and the fetch are completed,
  wherein after both the merge and the fetch are completed, write requests and read requests with respect to the specific base virtual disk are sent to the new snapshot and are completely run on the new storage pool.

11. The method according to claim 10, wherein each base virtual disk of the plurality of base virtual disks corresponds to a virtual machine of a plurality of virtual machines, wherein the at least one server comprises:
  a centralized data center management server, wherein a storage manager is implemented on the centralized data center management server, wherein the storage manager monitors IO characteristics of the plurality of virtual machines, wherein the centralized data center management server is connected to each other server of the at least one server and is coupled to the virtualized server, wherein the storage manager provides instructions to the virtualized server regarding imitating the copy-on-write/read snapshot creation process, including identification of the new storage pool.

12. The method according to claim 11, wherein the storage manager implements performance tracking and performance load balancing based on the monitored IO characteristics of the plurality of virtual machines.

13. The method of claim 12, wherein performance tracking tracks storage latency using dynamic sliding window tracking that samples the latency of each storage pool for q times and uses a latency prediction method to predict the storage latency.

14. The method of claim 13, wherein the latency prediction method is an exponentially weighted moving average (EWMA) method.

15. The method of claim 13, wherein the latency prediction method is an exponentially smoothing method.

16. The method of claim 13, wherein the latency prediction method is an auto regression method.

17. The method of claim 10, wherein the method further comprises a policy-based storage management algorithm comprising:
  determining a storage pool with the maximum latency "max_storage";
  determining a storage pool with the minimum latency "min_storage"; and
  generating performance using a performance model to check whether moving of one of the virtual disks from the maximum latency to the minimum latency will lower average storage latency and the latency difference across storage pools, wherein, when affirmative, adding the move to a migration list and updating an internal database to record the moving of one of the virtual disks; and wherein when negative, quitting iteration and outputting the migration list;
  wherein the performance model includes a workload modeling portion and a storage device modeling portion.

18. The method of claim 17, wherein the workload modeling portion comprises:
  generating an I/O workload for a first, second and third storage pool during a first phase of merging and fetching, where respective workload (WLA) equations are:

$$WLA_{sp1} = WLA_{Merge} + WLA_{fetch} =$$
$$f(1,512KB, 0\%, 0\%) + f(OIO, IOsize, 100\%, \text{randomness}),$$
$$WLA_{sp2} = WLA_{Merge} + WLA_{fetch} =$$
$$f(1,512KB, 100\%, 0\%) + f(OIO, IOsize, 100\%, \text{randomness}),$$
$$WLA_{sp3} = WLA_{workload} + WLA_{fetch} =$$
$$f(OIO, IOsize, \text{Read Ratio, randomness}) +$$
$$f(OIO, IOsize, 0\%, \text{randomness}),$$

where sp1 refers to the first storage pool, sp2 refers to the second storage pool, sp3 refers to the third storage pool, Merge refers to the merging of the first phase, and fetch refers to the fetching of the first phase;

generating the I/O workload for the first, second and third storage pools during a second phase of merging or fetching using the respective workload equations, where if the merging step of the second phase is finished first, $WLA_{Merge}$ is set to 0, or if the fetching step of the second phase is finished first, $WLA_{fetch}$ is set to 0;

generating the I/O workload after the second phase using a workload model equation:

$WL_i=(OIO, IOsize, \text{Read Ratio}, \text{randomness})$; and summing all I/O workloads together ($\Sigma WL_i$).

19. The method of claim 17, wherein the storage device modeling portion uses the following equation:

$$\rho = \frac{\Sigma WL_i}{L}$$

where, $\rho$ represents the device characteristic and L represents the last storage latency period generated by the following equation:

$L_i = \alpha^*(L_{t-1} + (1-\alpha)L_{t-2} + \ldots + (1-\alpha)^{i-1}L_{t-i})$ where $L_i$ means the ith sample of latency and $0<\alpha<1$; $\alpha$ equals 0.5; and $L_t$ is calculated for all storage pools; and wherein the device characteristic $\rho$ is recalibrated online at any time by a system.

20. The method of claim 10, wherein the method further comprises a hybrid method for selecting a snapshot process or a migration process comprising:

estimating a transition time for the snapshot process using the following equation:

$$TransitionTime_{snapshot} = \max\{Time_{Fetching}, Time_{Merging}\} = \max\left\{\frac{SnapshotSize}{Throughput_{appRead}}, \frac{SnapshotSize}{Throughput_{merge}}\right\}$$

where SnapshotSize is the size of snapshot file, $Throughput_{merge}$ is the throughput that merge process can get, and $Throughput_{appRead}$ is throughput associated with a workload;

estimating a transition time for the migration process using the following equation:

$$TransitionTime_{migration} = \frac{VirtualDiskSize + WorkingSetSize}{Throughput_{migration}}$$

where VirtualDiskSize is the size of entire virtual disk, $Throughput_{migration}$ is the throughput associated with the migration process, and WorkingSetSize is the working set size; and selecting a process for operation based upon a shorter transition time, where when the transition time for the snapshot process is shorter than the transition time for the migration process, the snapshot process is selected; and when the transition time for the migration process is shorter than the transition time for the snapshot process, the migration process is selected.

* * * * *